(12) United States Patent
Möller

(10) Patent No.: US 12,186,775 B2
(45) Date of Patent: Jan. 7, 2025

(54) POLYMER-BASED SUBSTRATE AND METHOD FOR PRODUCING THE SAME

(71) Applicant: Ensinger GmbH, Nufringen (DE)

(72) Inventor: Michael Möller, Cham (DE)

(73) Assignee: Ensinger GmbH, Nufringen (DE)

( * ) Notice: Subject to any disclaimer, the term of this patent is extended or adjusted under 35 U.S.C. 154(b) by 644 days.

(21) Appl. No.: 16/892,849

(22) Filed: Jun. 4, 2020

(65) Prior Publication Data

US 2020/0298272 A1    Sep. 24, 2020

Related U.S. Application Data

(63) Continuation of application No. PCT/EP2018/082594, filed on Nov. 26, 2018.

(30) Foreign Application Priority Data

Dec. 8, 2017   (DE) .......................... 102017129352.3

(51) Int. Cl.
  B32B 7/12    (2006.01)
  B05D 1/12    (2006.01)
  (Continued)

(52) U.S. Cl.
  CPC .................. B05D 1/12 (2013.01); B32B 7/12 (2013.01); B32B 27/08 (2013.01); C08J 7/043 (2020.01);
  (Continued)

(58) Field of Classification Search
  CPC ..... B32B 7/12; B32B 27/08; B32B 2255/205; B32B 2307/202
  (Continued)

(56) References Cited

U.S. PATENT DOCUMENTS

| 5,741,846 A | 4/1998 | Lohmeijer et al. |
| 6,035,596 A | 3/2000 | Brunnhofer |

(Continued)

FOREIGN PATENT DOCUMENTS

| CN | 101123314 A | 2/2008 | |
| CN | 104185547 A * | 12/2014 | ....... B32B 17/10005 |

(Continued)

OTHER PUBLICATIONS

Machine translation of WO 99/08808 A1 (Year: 1999).*

(Continued)

*Primary Examiner* — Callie E Shosho
*Assistant Examiner* — Steven A Rice
(74) *Attorney, Agent, or Firm* — Leydig, Voit & Mayer, Ltd.

(57) ABSTRACT

A polymer-based substrate is proposed, which in particular is electrostatically coatable, wherein the substrate has a substrate base body made using a polymeric material and a two- or multi-layer coating applied to a surface region of the substrate base body, wherein a first layer of the coating is configured as a bonding layer and is arranged in contact with the surface region of the substrate base body, wherein a second layer of the coating is configured as a lacquerable cover layer, wherein at least one layer of the coating is produced as a layer with reduced surface resistance using a proportion of an electrically non-insulating material, such that it results in a specific surface resistance of this layer of about $10^{10}$ Ohm or less, and wherein at least one layer of the coating is configured as a film.

19 Claims, 8 Drawing Sheets

(51) Int. Cl.
*B32B 27/08* (2006.01)
*C08J 7/043* (2020.01)
*C08J 7/044* (2020.01)
*C08J 7/048* (2020.01)
*C08K 3/04* (2006.01)

(52) U.S. Cl.
CPC ............... *C08J 7/044* (2020.01); *C08J 7/048* (2020.01); *B05D 2201/04* (2013.01); *B05D 2505/00* (2013.01); *B05D 2507/02* (2013.01); *B05D 2508/00* (2013.01); *B32B 2255/205* (2013.01); *B32B 2307/202* (2013.01); *C08K 3/041* (2017.05); *C08K 3/042* (2017.05); *C08K 2201/001* (2013.01)

(58) Field of Classification Search
USPC ...................................................... 428/411.1
See application file for complete search history.

(56) References Cited

U.S. PATENT DOCUMENTS

| | | | |
|---|---|---|---|
| 6,221,283 B1 | 4/2001 | Dharmarajan et al. | |
| 2003/0035910 A1 | 2/2003 | Ensinger | |
| 2006/0013979 A1* | 1/2006 | Ensinger | B01J 20/18 428/188 |
| 2007/0298267 A1 | 12/2007 | Zhong et al. | |
| 2008/0138610 A1 | 6/2008 | Neuhauser et al. | |
| 2011/0097544 A1* | 4/2011 | Grun | B05D 1/06 428/141 |
| 2011/0306255 A1* | 12/2011 | Rathenow | C04B 28/26 442/164 |
| 2013/0344314 A1* | 12/2013 | Shokri | H01B 1/04 428/221 |
| 2016/0121361 A1* | 5/2016 | Lendl | C09D 175/04 524/544 |
| 2016/0255184 A1* | 9/2016 | Hwang | H05K 7/20472 455/41.1 |

FOREIGN PATENT DOCUMENTS

| | | | |
|---|---|---|---|
| CN | 105517791 A | 4/2016 | |
| DE | 32 36 357 A1 | 4/1984 | |
| DE | 19519484 A1 * | 11/1996 | ......... B29C 47/0004 |
| DE | 10 2005 013 082 A1 | 8/2006 | |
| DE | 10 2011 110 899 A1 | 2/2013 | |
| EP | 0 667 625 A1 | 8/1995 | |
| EP | 0 685 527 B1 | 3/1997 | |
| EP | 0 667 625 B1 | 7/1997 | |
| EP | 0 957 226 A1 | 11/1999 | |
| EP | 2 071 585 A1 | 6/2009 | |
| EP | 2 360 341 B1 | 8/2011 | |
| EP | 2 559 838 A2 | 2/2013 | |
| EP | 2 427 518 B1 | 4/2017 | |
| WO | WO 1995/022152 A1 | 8/1995 | |
| WO | WO-9908808 A1 * | 2/1999 | ............... B05D 7/57 |
| WO | WO 2001/048346 A1 | 7/2001 | |
| WO | WO 2005/097902 A1 | 10/2005 | |
| WO | WO 2010/128013 A1 | 11/2010 | |
| WO | WO 2014/187982 A1 | 11/2014 | |
| WO | WO 2014/202724 A1 | 12/2014 | |

OTHER PUBLICATIONS

Chen, Zhangxian; et al., "Fabrication of Highly Transparent and Conductive Indium-Tin Oxide Thin Films with a High Figure of Merit via Solution Processing", Oct. 11, 2013, Langmuir, p. 13837 (Year: 2013).*
Machine translation of CN 104185547 (Year: 2014).*
Arash, B.; et al., "Mechanical properties of carbon nanotube/polymer composites", Oct. 1, 2014, p. 1 (Year: 2014).*
Machine translation of DE 195 19 484 A1 (Year: 1996).*
International Search Authority, Translation of the International Preliminary Report on Patentability in counterpart International Patent Application No. PCT/EP2018/082594, dated Jun. 18, 2020.
German Patent & Trademark Office, Search Report in counterpart German Priority Application No. 10 2017 129 352.3, dated Jul. 26, 2018.
International Search Authority, International Search Report in counterpart International Patent Application No. PCT/EP2018/082594, dated Apr. 12, 2019.
International Search Authority, International Written Opinion in counterpart International Patent Application No. PCT/EP2018/082594, dated Apr. 12, 2019.
Nanxing Zhou, "Questions and Answers of Practical Electrical Technology", *China Water & Power Press*.

* cited by examiner

POLYMER-BASED SUBSTRATE AND METHOD FOR PRODUCING THE SAME

CROSS-REFERENCE TO RELATED APPLICATIONS

This patent application is a Continuation of International Patent Application No. PCT/EP2018/082594, filed on Nov. 26, 2018, which claims the benefit of German Patent Application No. 10 2017 129 352.3, filed on Dec. 8, 2017, which each are incorporated by reference.

BACKGROUND OF THE INVENTION

The invention relates to a polymer-based substrate, which in particular is electrostatically coatable, and a method for producing the same.

Electrostatic coating, in particular powder lacquering of substrates is of great importance in many application areas, not only for decorative purposes but in particular also as protection against corrosion.

DE 10 2011 110 899 A1 proposes to equip an insulating web, which serves to connect a first and a second metallic outer profile, with electrically conductive longitudinal elements in wire form, in order to prepare said insulating web for a powder lacquering. The electrically conductive longitudinal elements are thereby electrically conductively connected in the transverse direction to each other and to the first or second outer profile, such that the composite profile made of the insulating web and the two metallic outer profiles can be powder lacquered.

Polyamide materials electrostatically coated with a powder lacquer are described in EP 0 667 625 B1. The polyamide material thereby contains in addition to the polyamide up to 10% by weight carbon fibers and 30 to 60% by weight of a metallic powder, wherein the weight ratio of the metallic powder to the carbon fibers should be 150:1 to 6:1. This results in plastic components that can be powder lacquered together with metal parts.

In EP 0 685 527 B1, a specific polyphenylene ether polyamide-based polymeric material with 1 to 7 parts by weight conductive soot per 100 parts by weight polymer is suggested, such that, for one, an Izod impact strength of more than 15 kJ/m$^2$ and a volumetric resistance value of less than 10$^6$ Ohm·cm is achieved. The polymeric material is designed for applications in which an electrostatic coating process is used.

EP 2 071 585 A1 proposes a thermoplastic composition with a continuous phase based on polyamide, in which a polyphenylene ether is dispersed. The composition further contains a conductivity additive which is contained in the continuous phase at a proportion of at least 50%. The volumetric resistance is less than 10$^5$ Ohm·cm. A field of application for the material is the automotive industry in which metallic and plastics-based components are often subjected to a powder lacquering together.

A further method for coating substrates, which is tailored to the automotive industry, is known from WO 2005/097902 A1. An electrically conductive polyamide composition is proposed for the production of the substrates, which composition comprises, in addition to the polyamide as the main component, a proportion of a novolac resin, a proportion of a reinforcing substance, and at least 0.1% by weight of an electrically conductive particulate filler.

Electrically conductive polyamide moulding masses with a reduced water absorption capacity are described in EP 2 427 518 B1. The moulding masses contain, in addition to the polyamide, a polymerizate of the propylene, a compatibilizer in the form of graft copolymers of the polypropylene as well as a proportion of carbon nanotubes (CNT).

For increasing the longitudinal shear strength of composite profiles, DE 32 36 357 A1 suggests providing the end regions of insulating webs, which engage into grooves of metal profiles, with a firmly bonded metal covering. According to this publication, further surface regions may also be provided with a metal covering so as to make said regions reflective for heat radiation and thus to improve the heat insulation of the composite profiles. It must hereby be ensured, however, that a distance of 1 to 2 mm is maintained between the metal covering of the end regions and the metal covering or the metal coverings of the further surface regions, so that the heat insulating effect of the insulating webs in the composite profile is not too significantly impaired.

Again for the improvement of the heat insulation in composite profiles by means of reflection of heat radiation, EP 2 360 341 B1 proposes applying infrared-reflective layers, optionally in the form of adhesive tapes, to surfaces of the metal profiles that are located on the inside of the composite profile. These infrared-reflective layers should also be applied to projections of plastic insulating webs that project into the interior of the composite profiles. These projections serve primarily to suppress convection in the interior of the composite profiles. The composite profiles are described as coatable with thermoplastic powder lacquers on the outer surfaces thereof.

The problems in the methods in the prior art are insufficient powder lacquer coverage, which is observed again and again, insufficient lacquer adhesion, and/or bubble formation in the lacquer layer after the powder coating in the area of plastic components, for example insulating webs of composite profiles.

In particular in the use of polyamide materials as substrates to be lacquered, there are often very narrow, difficult, or not controllable ranges for process parameters which would have to be met so as to avoid defects like bubble formation (e.g., too high residual moisture content in the substrate) and insufficient powder lacquer coverage or other lacquer errors like, for example, deviations in lacquer thickness (generally insufficient electrostatic properties, e.g., too low residual moisture content in the substrate).

Furthermore, in the prior art the polymeric material of the substrate is often modified in volume, for example by adding electrically conductive fillers, such that an improved conductivity/dissipative capacity is achieved in the total volume. However in this approach, physical properties like, e.g., the mechanical strength and the heat conductivity, but also the material costs, can be negatively affected.

BRIEF SUMMARY OF THE INVENTION

The object underlying the present invention is therefore to provide substrates in which the electrostatic powder lacquerability is improved in a reproducible and process-stable manner, without the heat insulating properties thereof and other relevant material and product properties, in particular the tensile and bending strength, being significantly affected.

This object is achieved in a polymer-based substrate with the features of claim 1.

Surprisingly, it has now been found that coatings can be applied to substrate base bodies which significantly improve the lacquering properties in wide process windows (the formation of bubbles in and beneath the lacquer is reduced; the powder or lacquer attraction and the lacquer adhesion to the substrate is improved) without significantly increasing the heat transfer (in particular by means of heat conduction) in the obtained product. Moreover, the substrates in accordance with the invention can be produced in a cost-effective manner and are compatible with possible further process steps, like, e.g., a wet-chemical pretreatment for anodizing processes.

DETAILED DESCRIPTION OF THE INVENTION

In accordance with the invention, a two- or multi-layer coating is applied to a surface region of a substrate base body made using a polymeric material, wherein a first layer of the coating is configured as a bonding layer and is arranged in contact with the surface region of the substrate base body, wherein a second layer of the coating is configured as a lacquerable cover layer, wherein at least one layer of the coating is produced as a layer with reduced surface resistance using a proportion of an electrically non-insulating material, such that it results in a specific surface resistance of said layer of about $10^{10}$ Ohm or less, and wherein at least one layer of the coating is configured as a film.

The bonding layer constitutes its own layer, which ensures the bonding of the further layer(s) of the coating in accordance with the invention to the substrate base body.

The bonding layer may in particular be conceived as an adhesive layer, a primer layer with an adhesive layer, or as a layer that is weldable to the substrate base body.

The specific surface resistance of the layer is measured in a conditioned state, i.e., after storage at 23° C.+/−2° C. and at 50%+/−10% relative humidity and according to the specifications of DIN EN 61340-2-3. Layers with a specific surface resistance reduced to $10^{10}$ Ohm or less are also referred to in the following as electrically dissipative.

For comparison: The specific surface resistance of dry polyamide PA66 with a content of glass fibers of 25% by weight (water content ≤0.4% by weight) without the addition of the additives reducing the surface resistance is about $10^{14}$ Ohm. After a conditioning, i.e., the storage defined above, the water content increases to about 1.9% by weight and the specific surface resistance decreases to about $10^{13}$ Ohm.

Alternatively, a measurement can be carried out according to an accelerated method in which a surface resistance is determined by means of electrodes with point-shaped measuring tips, which is determinable up to about $10^8$ Ohm using commercially available digital multimeters.

Because the measurement of the surface resistance according to the accelerated method typically results in a higher value than the measurement of the specific surface resistance according to the standard test method described above, in which the measurement is performed on a square area, wherein the electrodes are arranged on two opposing sides of the square, the measurement of the surface resistance allows for a determination in each case as to whether in a sample the specific surface resistance is below an upper limit of, e.g., $10^{10}$ Ohm, in particular below $10^9$ Ohm or below $10^8$ Ohm, or not.

If a measured value for the surface resistance of, e.g., $10^8$ Ohm or less, is obtained according to this accelerated method, a conclusion can be made regarding the specific surface resistance, which in such a case is less than $10^9$ Ohm. If no value is displayed due to exceeding the measuring range of the multimeter, this on the other hand does not allow the conclusion that the specific surface resistance is above $10^9$ Ohm; this must be tested again in such a case using a device with a greater measuring range.

The measurement of the specific surface resistance can be carried out precisely according to the standard testing method described above, though problems may arise in the implementation of the standard testing method in some cases where the sample to be tested has a complex, small-scale surface geometry. Here, the measurement of the surface resistance may then alternatively take place using the accelerated method, as described above.

Of course, the coating to be used in accordance with the invention may be applied to a sufficiently dimensioned planar test piece, which is made of the polymeric material of the substrate base body, and then the specific surface resistance can be determined according to the standard method.

The electrically non-insulating material as such that reduces the (specific) surface resistance can typically be characterized as electrically conductive or semi-conductive.

The Substrates in Accordance with the Invention Prove to Take Well to being Powder Lacquered and can be Distinguished in Particular by the Following Properties:

a) a good powder attraction and a homogeneous powder coverage when applying, in particular spraying, an electrostatically charged lacquer powder onto the grounded or electrically charged substrate;

b) an error-free setting, e.g., by baking, melting, sintering, or thermally hardening the lacquer—especially without bubble formation or hole formation (defects) within the lacquer layer or between the substrate and the lacquer layer, in particular when undergoing the necessary heating and temperature programs, for example during baking;

c) a solid adhesion of the lacquer layer to the substrate, so as to prevent a delamination, flaking, or crumbling of the lacquer layer under normal use conditions.

Baking Processes for Powder Lacquers Typically Require Temperatures of 170° C. or More, Preferably 180° C. or More, Though Temperatures of Over 200° C. May Also be Necessary.

Thereby, the substrates are held at a high temperature for several minutes, for example 10 minutes or longer, in particular 20 minutes or longer, in order to complete the film formation and cross-linking of the powder lacquer. Drying steps may also be part of the lacquering process, in which the substrate is often dried in advance at moderate temperatures of 80° C. to 150° C. Such drying steps provided in advance are preferably used in order to, for example, reduce or prevent an outgassing of volatile substances and in particular the release of residual moisture during the lacquer-baking process.

The specific surface resistance is preferably about $10^8$ Ohm or less, in particular about $10^7$ Ohm or less.

The two- or multi-layer coating may be configured to be self-adhesive and then contains the bonding layer as the first layer.

Furthermore, the bonding layer may be applied as the first layer of the two- or multi-layer coating by applying adhesive, for example by means of a doctor blade, separately, i.e., independently, of the further layer or layers of the coating, to the substrate body, and/or may be applied together to the further layer(s) of the coating.

Suitable adhesives are in particular reactive adhesives, bonding adhesives, and thermally activated adhesives. The adhesive may in particular be provided in the form of an adhesive tape.

The two- or multi-layer film may also be connected to the substrate base body by means of solvent bonding or welding, wherein the first layer as a bonding layer is then selected appropriately.

The connection of the coating to the substrate base body may be effected over a large area, in surface segments or only at points.

A partial contact of the coating to the substrate base body is achieved, e.g., if the substrate base body has recesses, perforations, or through-openings, which are covered by a continuous coating in accordance with the invention. Likewise, e.g., a substrate base body may have geometries, shapes, or moulded elements, the surface contours of which should not or cannot be covered by a coating in accordance with the invention, e.g., continuous grooves, undercuts, channels, depressions, or sharp bends and radii at projections or protrusions. This is shown, e.g., in FIG. 2E, in which the coating does not abut the substrate base body over the full area.

It may further be necessary or useful to apply the bonding layer not over the full area and continuously, but rather only partially, e.g., only in lines or in points, as a result of which the coating is then accordingly connected to the substrate base body only in the regions provided with the bonding layer.

Preferably the reduction of the specific surface resistance can be achieved by means of electrically conductive or semi-conductive materials. These materials are preferably selected from carbon-based components, in particular conductive soot, CNT, carbon fibers, carbon layered materials, in particular graphite, graphene, and graphene oxide, electrically conductive and semi-conductive ceramic, in particular semi-conductive tin oxides, electrically conductive polymers, metals, for example in the form of metallic layers, metal powders, metal flakes, and metal fibers.

In the case of the semi-conductive ceramics, for example the semi-conductive tin oxides, in particular the indium-doped tin oxide and the fluorine-doped tin oxide (ITO and FTO, respectively) are preferred. These are used in particular in the form of a continuous layer or in the form of polymer-bound powders.

The layer with reduced surface resistance may also be built from a substantially continuous layer of an electrically conductive material.

Preferable substrates in accordance with the invention comprise the electrically conductive material in the form of a metal layer, in particular an aluminum, copper, or silver layer, wherein the metal layer preferably has a thickness of about 500 nm or less, in particular about 200 nm or less, particularly preferably about 100 nm or less.

If metallic aluminum or another metal that is chemically very vulnerable is used as the electrically conductive material, said material is preferably used below the cover layer in order to, e.g., prevent an undesired oxidation to $Al_2O_3$, so as to avoid a reduction in the electrical conductivity of the layer.

By using a protective cover layer, in particular made of a suitable polymer, it is thus possible to maintain the electrical conductivity of a thin metal layer (e.g., an aluminum vapor-deposited layer with a layer thickness of 100 nm or less), even if the substrates in accordance with the invention are taken through chemical or electrochemical pretreatment baths, e.g., anodizing baths. The wet-chemical pretreatment is a common procedure in the process for producing powder lacquered plastic-metal composite profiles.

In particularly preferable substrates in accordance with the invention, the layer with electrically conductive material comprises a non-metallic electrically conductive material, which is selected from a) conductive carbon fiber materials, in particular conductive soot, graphite, graphene, carbon nanotubes (CNT), or a carbon layer;

b) conductive inorganic materials, in particular conductive tin oxides;

b) intrinsic conductive polymers, in particular polymers with continuously conjugated double bonds, e.g., polyparaphenylene, polyaniline, or polythiophene; and/or d) conductively equipped polymeric materials, comprising a non-conductive polymer and an additive reducing the electrical resistance of the non-conductive polymer, which additive in particular is selected from conductive soot, graphite, graphene, CNT, and conductive inorganic materials and intrinsically conductive polymers.

The carbon layer mentioned under variant a) may be produced, e.g., in a sputtering process or another deposition process known to the person skilled in the art.

In other preferable substrates in accordance with the invention, the layer with electrically conductive material comprises a fiber material with electrically conductive or semi-conductive fibers, in particular in the form of a flat material, in particular in the form of a fiber felt, a fibrous non-woven fabric, a fibrous woven fabric, and/or a fiber network structure, wherein the fiber material in particular comprises metal fibers, fibers of conductive polymer, conductively equipped polymer fibers, and/or carbon fibers.

Depending on the Fiber Type, Different Maximum Fiber Thicknesses are Recommended, for Example copper fibers with a thickness of about 60 μm or less, carbon fibers with a thickness of about 10 μm or less, carbon nanotubes (CNT) with a thickness of 100 nm or less, steel fibers with a thickness of about 50 μm or less, and fibers of electrically conductive polymers with a thickness of about 50 μm or less may be used with good results.

The orientation of the fibers is thereby preferably selected such that a crossing of the fibers is achieved and a fiber touches and electrically conductively contacts one or more other fibers. This can be verified by means of a macroscopic measurement of the resistance or can be verified microscopically.

The fiber length is preferably a multiple of the fiber thickness, preferably 5 times the thickness or more.

In order keep the absolute layer thickness of the two- or multi-layer coating low, it is recommended that the layer with reduced surface resistance be configured as thinly as possible. This is made simple if the electrically conductive materials themselves are as thin as possible or can be applied thinly and if a percolation path for dissipating electrical charge is formed, even in the case of small proportions of said materials.

Therefore, fibrous, rod-shaped, or platelet-shaped electrically conductive particles are preferable, preferably with an aspect ratio A of A≥2, particularly preferably A≥5. The aspect ratio A is thereby defined by the quotient of the length L in a spatial direction, for example x or y, and the thickness D (e.g., of platelet-like particles or of rod-shaped or fibrous particles) in a spatial direction z perpendicular to x or y. This results in the relationship $$A=L/D.$$

Substantially spherical or cubic particles may also be used, as long as the amounts used or the proportions used ensure an electrical conductivity/dissipative capacity and sufficiently reduce the specific surface resistance of the layer.

The particles are thereby selected in a spatial direction with the smallest possible thickness, the thicknesses D of the electrically conductive particles are thereby preferably about 100 µm or less, thicknesses D of about 20 µm or less are particularly preferable. Conductive particles of that kind may be dispersed in an electrically non-conductive matrix, e.g., a polymer or a polymeric material, and thus form a handleable electrically conductive material that then in turn can form an electrically dissipative layer.

In a particularly preferable embodiment of the invention, the two- or multi-layer coating has on its surface facing toward the substrate base body a bonding layer that is produced using an electrically conductive material. This may be an adhesive—preferably a bonding adhesive—which is equipped to be electrically dissipative using the above-described electrically conductive or semi-conductive particles.

An electrically conductively equipped adhesive of that kind may, e.g., be co-extruded, applied by means of a doctor blade, by transfer by means of transfer rollers, by spraying or otherwise applied to a substrate base body.

In a further, particularly preferable embodiment of the invention, the cover layer is produced using an electrically conductive material. It must hereby be ensured that the materials are suitably selected and that the electrical dissipative capacity is not impaired by handling or processing steps in further processing, for example in oxidative anodizing baths.

Substrates in accordance with the invention preferably comprise a two- or multi-layer coating with a layer that comprises a plastic material, in particular in the form of a film, based on a polyolefin, in particular polypropylene (PP) or polyethylene (PE), on ethylene vinyl acetate (EVA), on a polyester, in particular polyethylene terephthalate (PET), or on a polyamide (PA), in particular PA6, PA66, PA12, polyphthalamide (PPA), and partially aromatic PA, on a vinyl polymer, in particular polystyrene (PS), and on a copolymer of the aforementioned polymers.

Furthermore, substrates in accordance with the invention are preferred in which the two- or multi-layer film comprises a layer with a reinforcing material, wherein the reinforcing material in particular is selected from reinforcing fibers, preferably glass, mineral, carbon, or plastic fibers, or from particulate inorganic materials, preferably silicon oxide, aluminum oxide, talcum, chalk, carbon, silicate or glass.

Preferred substrates in accordance with the invention comprise a two- or multi-layer coating, in which at least one of the layers is a monoaxially or biaxially stretched film material, wherein said layer is preferably made of a polymeric material, selected from polyolefin, polyamide, or polyester material.

In a further preferred substrate in accordance with the invention, the surface of the cover layer of the two- or multi-layer coating is pretreated to improve the bonding of a lacquer layer, in particular a powder lacquer layer, that is subsequently to be applied, in particular by means of siliconization, a physical vapour deposition (PVD) or chemical vapour deposition (CVD) coating, a plasma, flame, or corona treatment, a pickling treatment, and/or the application of a primer layer.

Suitable pretreatment methods including picking and primer materials are described, e.g., in G. Habenicht "Kleben", 6th Edition 2009, Springer Verlag (ISBN 978-3-540-85264-3), Chapter 2.7.15 f, page 161 ff., and Chapter 14.1, page 652 ff.

The two- or multi-layer coating on the surface region of the substrate base body preferably has a thickness of about 200 µm or less, in particular about 5 µm to about 100 µm, further preferably about 10 µm to about 80 µm.

The two- or multi-layer coating of the substrates in accordance with the invention may be detachably connected to the substrate base body. Here an unmixed recycling of the substrate base bodies at the end of a product life cycle is particularly simple, because the two- or multi-layer coating only has to be removed from the substrate parts that are to be recycled. Thus the subsequently applied lacquer layers can also be separated from the substrate base body particularly easily.

In regard to this, the bonding layer can preferably be configured in such a way that in a recycling step it is selectively vulnerable to, decomposed or dissolved by means of predetermined solvents or chemicals, or that certain physical parameters like, e.g., high temperatures, lead to detachment.

In the case of other demands on the substrates in accordance with the invention, provision may be made for the two- or multi-layer coating to be non-detachably connected to the substrate base body. Preferably the pulling forces required here are so high that the coating is destroyed when attempting to mechanically remove it.

For the non-detachable connection of the substrate body to the two- or multi-layer coating, in particular reactive or hardening or cross-linking adhesives (one-component, two-component (1K-, 2K-) reactive adhesives etc.) are suitable for forming the bonding layer. Preferably reactive or hardening laminating adhesives on epoxide or polyurethane basis are used. Solvent adhesives, melt adhesives, bonding adhesives, or dispersion adhesives could also be used, though.

Furthermore, in substrates in accordance with the invention, the two- or multi-layer coating may be configured as a diffusion barrier against outgassing, in particular the outgassing of water vapor, from the substrate base body.

The diffusion barrier is preferably selected or configured such that a water vapor permeability of about 40 $g/m^2d$ or less is achieved, measured according to DIN 53122 at a temperature of 38° C. and relative humidity of 90%. Further preferably, the water vapor permeability is about 20 $g/m^2d$ or less, in particular about 5 $g/m^2d$ or less.

A good water vapor diffusion barrier has a positive effect on the lacquering result because in particular outgassing by the substrate base body is reduced or suppressed, whereby defects, e.g., bubbles below or within a lacquer layer that has possibly been applied, can be avoided.

The substrate base bodies may, in accordance with the present invention, be present in a wide variety of shapes and materials. The use of hollow chamber profiles is thereby possible, as well as the use of non-hollow chamber profiles.

The substrates in accordance with the invention can be advantageously configured and used as heat-insulating profiles, in particular for the production of window, door, and facade elements. The heat-insulating properties required there are not noticeably affected by the application of the two- or multi-layer coating. Examples of heat-insulating profiles are known, e.g., from the delivery programs of the trademark insulbarx of the company Ensinger or from WO 01/48346 A1.

Preferably two- or multi-layer coatings are selected in which the layer thickness or the respective layer thicknesses of the individual layers, in particular the thicknesses of the electrically conductive layers, are minimized in order to keep the heat conduction minimal.

Preferably a two- or multi-layer coating is selected in which the sum of the products of the respective layer thickness with the respective heat conductivity of a layer yields values of $1.0 \times 10^{-4}$ (W·m/m·K), i.e., (W/K), or less. This calculation of the heat conductivity is derived from the calculation "Langenbezogener Warmedurchgangskoeffizienten des Glas-Rahmen-Verbindungsbereiches" in DIN EN ISO 10077-1:2010-05, annex E3. In contrast to the requirements of the standard, the calculation in the present case is related only to the two- or multi-layer coating of the substrates in accordance with the invention and not to the substrate base body (the base profile). The values of the heat conductivity may thereby be taken from known materials from databases, data sheets and tables, or be measured using suitable methods.

An example to clarify: a coating not in accordance with the invention made of conventional rolled aluminum with a layer thickness of the rolled aluminum layer of about 20 μm and a heat conductivity value λ, of about 236 W/m·K and an acrylic adhesive layer with a layer thickness of about 10 μm and a heat conductivity value λ, of about 0.18 W/m·K adds up to a sum of the λ, thickness products of about $4.72 \times 10^{-3}$ (W·m/m·K), i.e., (W/K).

In contrast thereto, e.g., a multi-layer coating in accordance with the invention with a thickness of about 50 μm, which comprises a plurality of plastic layers including a self-adhering first layer (λ, value about 0.24 W/m·K) and two separate internal aluminum metallized layers each with a thickness of about 50 nm (λ, value about 236 W/m·K), has a sum of the λ, thickness products of about $2.38 \times 10^{-5}$ (W/K).

Suitable substrate base bodies for use as insulating profiles are familiar to a person skilled in the art and are widely described in the literature. Typically, in cross section perpendicular to the longitudinal direction, straight, bone-shaped, chicane-like, angled, bent, offset profiles and/or profiles provided with hollow chambers are used. Such profiles may have additional functional zones or elements like, e.g., hooks, grooves, arrows, and/or screw channels.

The present invention can generally be implemented in the form of a substrate that is designed as a moulded part for an application outdoors, in particular as a moulded part with the function of a holding element or a covering element.

The substrate base body is preferably a profile, e.g., an extruded or a pultruded plastic profile; it is also conceivable, however, for other substrate base bodies to be provided with a coating in accordance with the invention as a functional coating, for example injection molded parts or sandwich components.

Of particular importance in accordance with the invention as substrates are: moulded parts with the function of a holding element or covering element in the field of plant technology for renewable energies, for example wind power, solar energy, hydroelectric plants, or also in the field of automotive engineering, transportation, for garden equipment and for sports and leisure equipment.

In preferred embodiments of the invention, the polymeric material of the substrate base body comprises reinforcing substances, in particular selected from particulate and fibrous reinforcing substances, further preferably selected from glass spheres, hollow glass spheres, glass fibers, carbon fibers, ceramic fibers, ceramic particles, polymer particles or polymer fibers. The substrate base bodies may also contain metallic elements as functional or reinforcing elements, e.g., fittings or reinforcing wires.

Substrate base bodies may, in accordance with the present invention, be porous or be porous in partial regions.

Suitable substrate base bodies are typically oblong plastic products, preferably extruded or pultruded plastic profiles. These are available in a variety of geometries and shapes.

Further processed substrates in accordance with the invention may have a powder lacquer layer, which in particular has a layer thickness in the range of about 10 μm to about 300 μm, preferably about 60 μm to about 200 μm. The powder lacquer layer is in particular applied by means of a powder baking lacquering process.

Preferably, the powder lacquer layer is applied to the cover layer of the two- or multi-layer coating with a lacquer coverage of about 90% or more, in particular about 95% or more, particularly preferably about 98% or more.

The two- or multi-layer coating applied to the substrate base body in accordance with the invention can easily be designed such that it withstands the handling and processing processes substantially undamaged and in particular tolerates the baking of a powder lacquer at temperatures of up to 200° C. and dwell times of up to about 30 minutes.

The two- or multi-layer coating applied to the substrate base body in accordance with the invention can also in particular be designed to be chemically resistant, such that it remains substantially unchanged even under the conditions of eloxal or anodizing baths, and the electrostatic lacquerability of the substrate is maintained. Such coatings preferably have a layer containing metallic aluminum arranged below the cover layer, or a layer with conductive soot, wherein the latter can also function as a cover layer under such conditions.

The coating applied in accordance with the invention to the surface region of the substrate base body may be configured in a variety of ways, in particular as a continuous or large-area covering of the surface.

Preferably a so-called viewing surface, specifically a surface that is potentially visible in the end application, of the substrate base body is equipped, in accordance with the invention, with the coating.

It is also possible, however, for a surface not visible in the end application to be equipped with the coating, in particular the rear side of a substrate base body, because the electrostatic effects that are present can also act through the substrate body and make the then uncoated viewing side electrostatically lacquerable. In this case, it may be advantageous to use a non-temperature stable film, which brings about a good powder attraction on the viewing side in the lacquering process, but then detaches during the following lacquer baking step and as a result no longer contributes to the heat transfer in the end product.

For certain applications, small-area surface regions of the substrate base body may be provided with a coating.

Here, the coating is then selectively applied to one or a plurality of predetermined smaller and/or larger surface region(s) of the substrate base body which is/are provided for a subsequent electrostatic coating, in particular a powder lacquering, or which extends/extend substantially in parallel to a surface region of the substrate which is provided for an electrostatic coating, in particular a powder lacquering.

The present invention relates, in accordance with a further aspect, to a method for producing a lacquerable, in particular electrostatically powder lacquerable, polymer-based substrate.

The method in accordance with the invention comprises:
providing a polymer-based substrate base body which comprises a polymeric material with a first polymer, applying a two- or multi-layer coating, comprising a first layer as a bonding layer and a second layer as a lacquerable cover layer, to a surface region of the substrate base body of the substrate to be coated, wherein the first layer as a bonding layer is brought into contact with the surface region of the substrate base body, wherein at least one layer of the coating is produced as a layer with reduced surface resistance using a proportion of an electrically non-insulating material, such that it results in a specific surface resistance of said layer of about $10^{10}$ Ohm or less, and wherein at least one layer of the coating is configured as a film.

The substrates in accordance with the invention can be lacquered with a high lacquer coverage rate when applying a lacquer layer, in particular electrostatically applying a powder lacquer layer, such that a very homogeneous appearance of the lacquered surface can be achieved.

A high lacquer coverage rate can be achieved in accordance with the invention in a reproducible and process-stable manner in particular when the substrates are dry, i.e., the content of residual moisture present in the substrate base body is about 0.5% by weight or less, in particular about 0.3% by weight or less. This property is advantageous in particular for the lacquering processes of hygroscopic polymeric materials (e.g., polyamide-based materials).

The lacquer coverage rate can be determined by spraying a representative reference area with lacquer powder or lacquer spray and then directly or after baking determining the surface portions without lacquer application. True-to-scale, undistorted light-microscopic images at 50× magnification are suitable for evaluation. A representative reference area has, e.g., a length of 25 mm in the longitudinal and transverse direction and is preferably located in the directly visible area of the substrate. Then the surface portions which are not covered by lacquer (=lacquer-free area) are determined within this reference area. This may be performed by measuring the surface integral manually or by determining it with the support of software. This analysis may optionally be repeated on different reference areas and then averaged. The rate of lacquer coverage is then calculated according to:

$$\text{lacquer coverage in \%} = 100\% \times \left(1 - \frac{\text{lacquer}-\text{free area in mm}^2}{\text{total reference area in mm}^2}\right)$$

In the case of composite profiles having uneven surfaces and/or undercuts and profiles in which the substrate in accordance with the invention is directly adjacent to shielding, protruding metal components (similar to a "Faraday cage"), the lacquer coverage may be locally reduced. These regions are not to be regarded as representative reference areas.

In accordance with a variant of the method in accordance with the invention, the two- or multi-layer coating is applied to a surface region of the substrate base body, which is provided for a subsequent lacquering, in particular a powder lacquering.

In the method in accordance with the invention, the two- or multi-layer coating is preferably provided as sheet material and applied to the substrate base body.

The method in accordance with the invention can be used particularly advantageously on surface regions which after powder lacquering represent a visible surface region in the end application.

In accordance with an alternative variant of the method in accordance with the invention, the two- or multi-layer coating is applied to a surface region of the substrate base body, which is arranged substantially in parallel to a surface region that is provided for a subsequent powder lacquering. Here the powder lacquer is not applied to the cover layer of the coating, but rather to a coating-free surface region of the substrate base body.

The method in accordance with the invention can also be carried out in such a way that the first layer is first applied as a bonding layer to the substrate base body and that subsequently the second layer and optionally further layers of the coating is/are applied to the first layer.

In many applications, the substrates in accordance with the invention are used in conjunction with at least one metal profile and are thereby subjected to a powder lacquering.

In this case, it is advantageous if the two- or multi-layer coating is applied beforehand to the substrate that is connected to at least one metal profile, for example an aluminum profile, in such a way that, after connecting the substrate to the metal profile, the coating has a physical contact with the metal profile.

The contact may be such that the coating or the layer thereof with reduced surface resistance is electrically conductively contacted by the metal profile. A good powder attraction and deposition upon powder coating can then be achieved here, primarily by way of a so-called grounded mechanism.

According to another variant, a good powder attraction can be achieved by way of a so-called capacitive mechanism without an electrically conductive contact with the metal profile. Here it is possible for the coating to be applied to the substrate base body without any contact with the metal profile.

In the grounded mechanism within the meaning of the present invention, a charge applied by way of electrostatically charged powder particles is discharged from the substrate by means of a grounded electrical line. Repulsive electrostatic forces are thus prevented from forming or building up during the powder application.

In the capacitive mechanism within the meaning of the present invention, among other things a local capacity is provided on the substrate for receiving electrical charge; this is at first not dissipated, but rather only distributed over larger areas, thereby reducing the acting electrical field forces (repulsive forces between charged powder particles).

In accordance with a variant of the method in accordance with the invention, the substrate is connected to at least one metal profile, in particular an aluminum profile, wherein the two- or multi-layer coating is applied to the substrate base body in such a way that, after connecting the substrate to the metal profile, the layer of the coating with a reduced surface resistance has a physical contact with the metal profile.

This can be achieved, e.g., by the layer of the coating with reduced surface resistance protruding laterally at the rim of the coating in such a way that the layer with reduced surface resistance can be brought directly into contact with the metal profile.

Alternatively, e.g., the aluminum profile may be prepared in such a way that tooth-like structures in the aluminum ("knurling") penetrate into the coating during the roll-in process to produce plastic-aluminum composite profiles, and protrude at least up to the conductive or dissipative layer and directly contact the same. This is preferred if the coating has a multi-layer structure and the second layer and/or further layers between the conductive or dissipative layer and the second layer are electrically insulating.

In accordance with a further variant of the method in accordance with the invention, the substrate base body is connected to at least one metal profile, in particular an aluminum profile, and the layer of the two- or multi-layer coating with reduced surface resistance, optionally the two- or multi-layer coating as a whole, after connecting the substrate base body to the metal profile, is applied to the substrate base body in such a way that the layer with reduced surface resistance has a physical contact with the metal profile. A uniform appearance of the surfaces can be achieved here in a particularly simple manner for the metal-plastic composite.

These and further advantages and advantageous embodiments of the present invention become clear from the following description of the figures and examples.

DETAILED DESCRIPTION OF THE DRAWINGS

The figures described in detail in the following are schematic representations that are not true to scale and in particular do not depict the real relationships of the layer thicknesses of the layers among each other. The layer sequences shown are examples and can be widely varied in accordance with the invention. With regard to the nomenclature, within the meaning of the invention, a first and a second layer are discussed here, referring to the definitions made in claim 1. There may be further layers between the first layer in accordance with the invention and the second layer in accordance with the invention, thus a second layer of the coating from the geometric sequence does not necessarily have to represent the second layer of the coating within the meaning of the invention.

FIGS. 1A to 1E shows with the example of a so-called insulating profile in different variations a substrate 10, 30, 50, 70, 90 in accordance with the invention in the different sub-FIGS. 1A, 1B, 1C, 1D and 1E, which all have a substrate base body 12 that in cross section perpendicular to its longitudinal direction has an offset configuration on both sides, wherein so-called roll-in projections 14 and 16 are moulded onto both rim regions of the offset part.

The substrate base body 12 is typically extruded, optionally also pultruded, and then already has the shape shown in FIGS. 1A to 1E with the offset cross section and the moulded-on roll-in projections 14 and 16.

In accordance with the invention, a two- or multi-layer coating 18, 38, 58, 78, and 98, respectively, which is configured differently in FIGS. 1A, 1B, 1C, 1D, and 1E, is applied to this substrate base body 12.

Figure 1A:
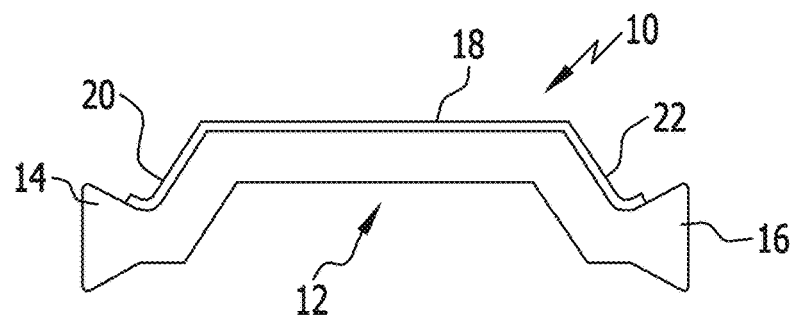
FIGS. 1A to 1E show a schematic depiction of the production of a substrate in accordance with the invention in multiple variations.

In FIG. 1A, the two- or multi-layer coating 18 extends with its rim regions 20 and 22 up to the one roll-in projection 14 and the other roll-in projection 16, respectively. As a result, upon connecting the substrate 10 to metal profiles by rolling in, a physical contact of the metal profiles with the two- or multi-layer coating 18 can be produced, as is described in detail in connection with FIG. 2A.

Figure 1B:
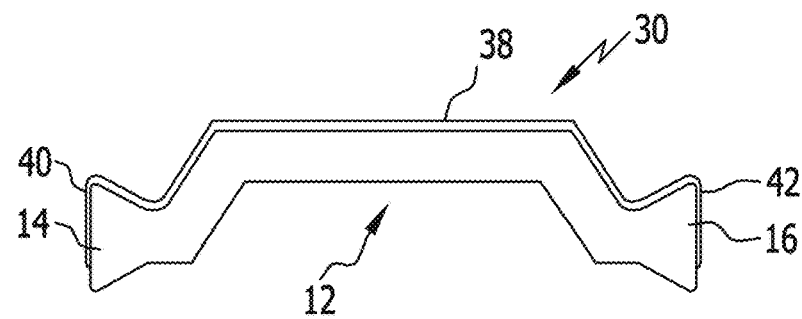

In FIG. 1B, a two- or multi-layer coating 38 extends with its rim regions 40, 42 up to and around the roll-in projections 14 and 16.

Figure 1C:
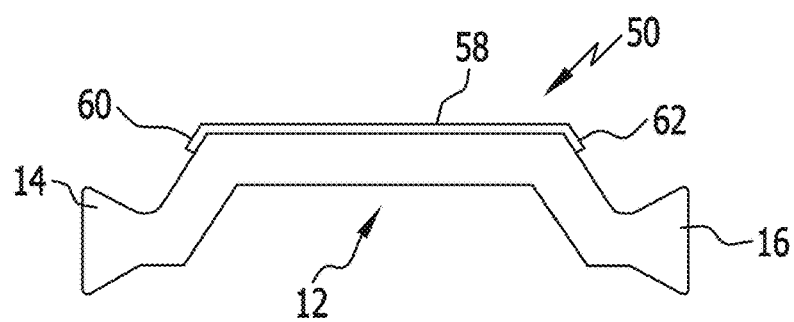
Figure 2A:
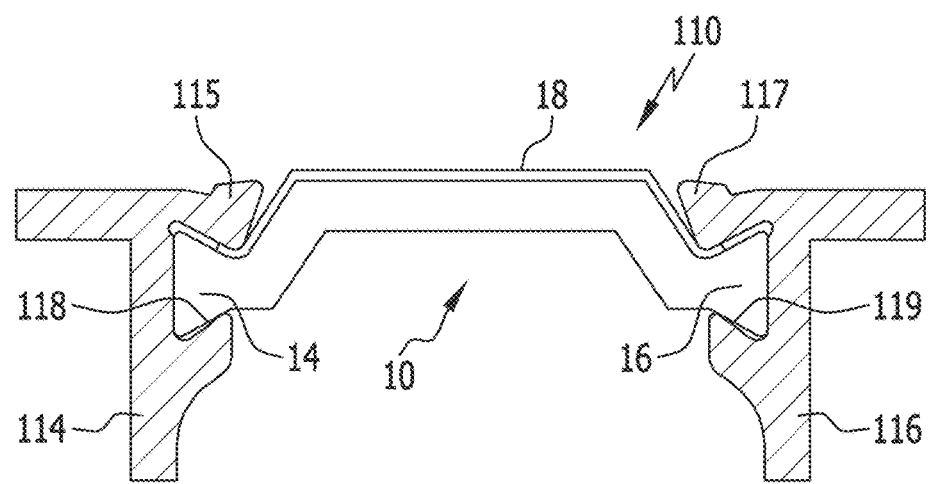
FIGS. 2A to 2F show further embodiments of a substrate in accordance with the invention as part of metal-plastic composite profiles.
Figure 2B:
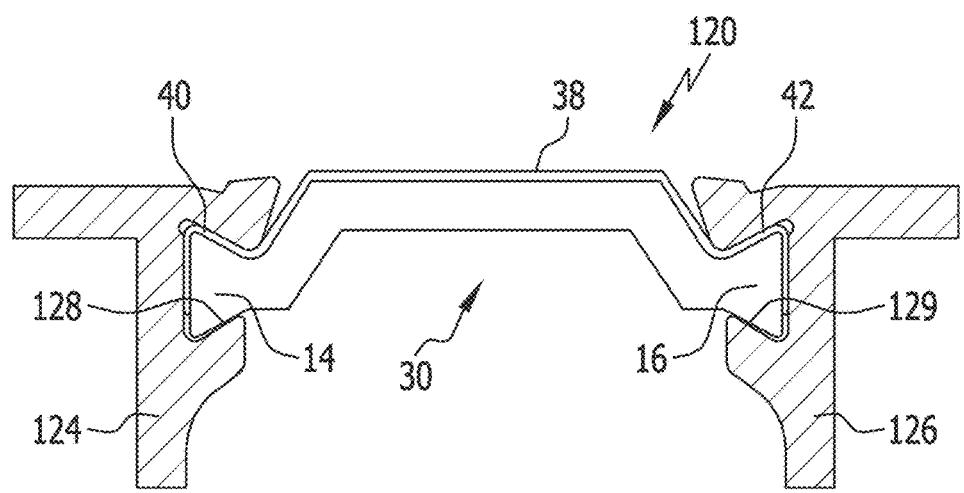
Figure 2C:
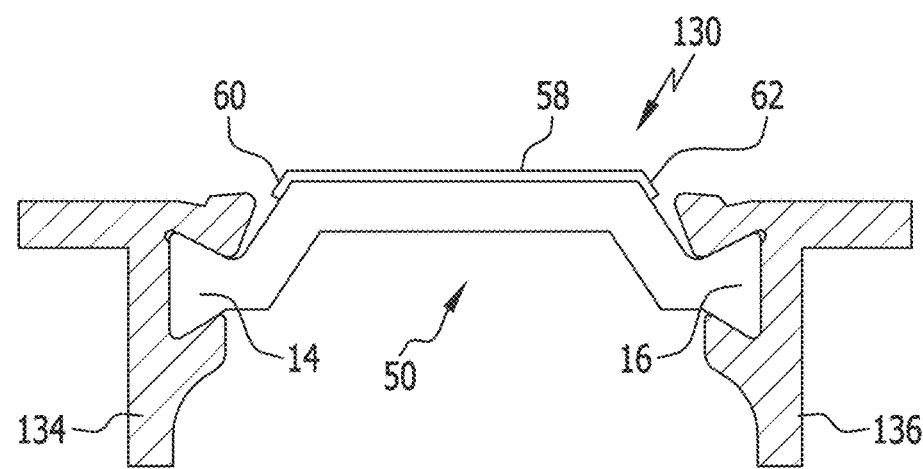

In FIG. 1C, a variant of the substrate 50 in accordance with the invention is shown, in which the insulating profile (substrate) 50 is provided with a coating 58, which still covers a part of the offset region of the insulating profile 50 with its rim regions 60, 62, though is not tangential to the regions of the roll-in projections 14 and 16, but on the contrary maintains a distance from said roll-in projections 14 and 16, said distance being sufficient in the rolled-in state so as to avoid a physical contact with the metal profiles (see FIG. 2C).

Figure 1D:
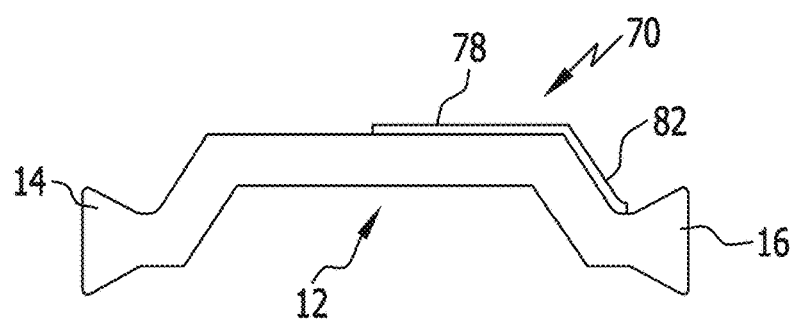

In FIG. 1D, an example of a substrate 70 in accordance with the invention is shown, in which the insulating profile (substrate 70) in cross section is covered by a coating 78 only halfway, said coating 78 in turn extending to one of the roll-in projections, the roll-in projection 16, from the rim region 82 of the coating 78. Again as in the embodiment in FIG. 1A, after rolling-in, it is achieved that a physical contact between the coating 78 or the rim region 82 thereof and the metal profile is produced.

Figure 1E:
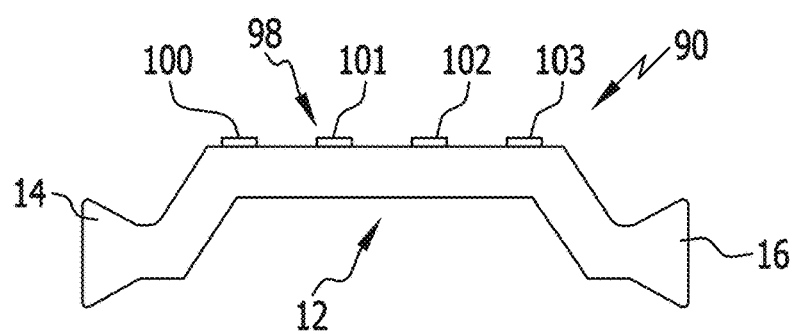

A further embodiment of the substrate 90 in accordance with the invention is shown in FIG. 1E, in which the coating covers only selected regions of the surface of the substrate base body 12, wherein the coating 98 is divided here into four strip shaped coating elements 100, 101, 102, 103, which are arranged in parallel to each other and extend in the longitudinal direction of the substrate.

In this embodiment of FIG. 1E too, a physical contact of the coating 98 with the metal profiles in the rolled-in state is avoided, as can be seen analogously in the illustration 2D.

In FIGS. 2A to 2F, in the sub-FIGS. 2A, 2B, 2C, 2D, 2E, and 2F different embodiments of substrates in accordance with the invention are shown, which are connected to metal profiles to form a plastic-metal composite profile. These composite profiles are designed to, after the assembly shown in FIGS. 2A to 2F, be coated together both in the region of the substrate in accordance with the invention and in the region of the corresponding metal profiles with a lacquer layer, in particular a powder lacquer layer.

The details of the different embodiments of FIGS. 2A to 2F are as follows:

FIG. 2A shows a metal-plastic composite profile 110 with a substrate 10 in accordance with the invention and a first and a second metal profile 114, 116, which are connected to the roll-in projection 14 and the roll-in projection 16, respectively, of the substrate in accordance with the invention or insulating profile 10 by means of rolling-in.

The roll-in projections 14 and 16 are thereby inserted into grooves 118, 119 of the metal profiles 114 and 116, respectively, and then are fixed by means of a rolling-in process by means of positive- and/or force-locking due to a deformation of the profile parts 115 and 117 of the metal profiles 114 and 116 called a roll-in hammer.

A physical contact of the metal profiles 114 and 116 with the two- or multi-layer coating 18 of the insulating profile 10 is hereby achieved.

If the metal profile(s) is/are provided with a sharp-toothed knurling, with sufficient pressure when rolling in, an electrically conductive contact of the electrically conductive layer to the metal profile(s) can then be formed even if the coating has an electrically insulating cover layer, i.e., a layer with a specific surface resistance greater than $10^{10}$ Ohm.

In FIG. 2B, a metal-plastic profile 120 is shown, in which the substrate 30 in accordance with the invention in the form of an insulating profile is connected to a first metal profile 124 and a second metal profile 126.

The composite is hereby achieved by inserting the roll-in projections 14 and 16 of the insulating profile 30 into the grooves 128, 129 and then rolling in, wherein a physical contact of the metal profiles 124 and 126 with the two- or multi-layer coating 38 of the insulating profile 30 is produced. The physical contact between the metal profiles 124, 126 and the two- or multi-layer coating 38 of the insulating profile 30 is possible here over a larger area, because the rim regions 40, 42 of the two- or multi-layer coating 38 extend over a larger area of the roll-in projections 14, 16.

In contrast thereto, in the embodiment of FIG. 2C a metal-plastic composite profile 130 is provided in which a substrate in accordance with the invention in the form of an insulating profile 50 is connected by way of its roll-in projections 14 and 16 to a first metal profile 134 and a second metal profile 136, as was already described, by way of a roll-in connection.

The two- or multi-layer coating 58 of the insulating profile 50 has rim regions 60, 62 which maintain a distance from the metal profiles in the installed state of the metal-plastic composite profile 130.

While in the embodiments of FIGS. 2A and 2B a physical contact of the layer with reduced surface resistance of the two- or multi-layer coating 18 and 38, respectively, with the metal profile or metal profiles is produced, which contact may also be electrically conductive, in the embodiment of FIG. 2C the possibility of an electrically conductive connection between the metal profiles 134, 136 on the one hand and the layer with reduced surface resistance of the coating 58 on the other hand is deliberate foregone, such that a capacitive mechanism is used here in an electrostatic powder coating.

Figure 2D:
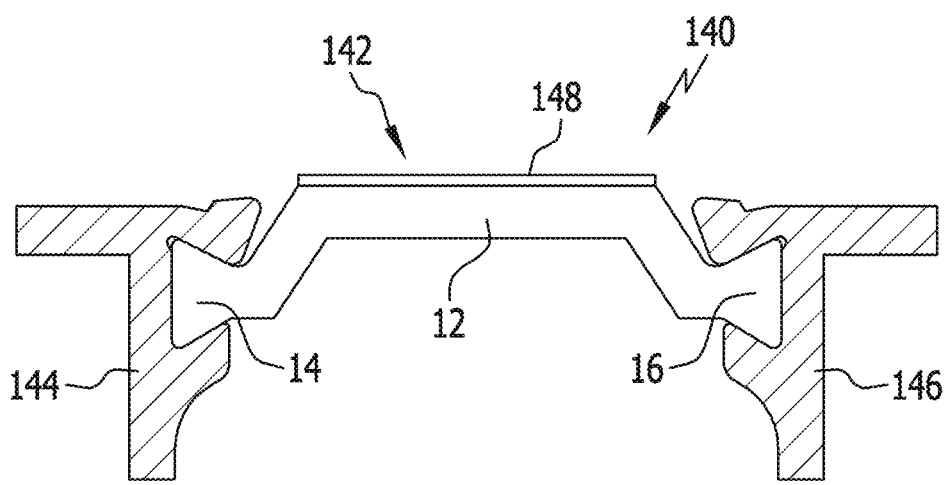

The same principle is used with a metal-plastic composite profile 140, as shown in FIG. 2D, in which an insulating profile 142 is used together with two metal profiles 144, 146 and the connection between the metal profiles on the one hand and the insulating profile 142 on the other hand is again achieved by rolling in the roll-in projections 14 and 16 of the substrate base body 12.

In this embodiment of the substrate/insulating profile 142 in accordance with the invention, provision is made for a two- or multi-layer coating 148 to be applied only to the region of the insulating profile 142 that is not offset, such that the spatial distance of the rim regions of the coating 148 from the metal profiles 144 and 146 is even more significant than in the embodiment of FIG. 2C. In this embodiment of FIG. 2D, again the capacitive mechanism is used in an electrostatic powder coating.

Figure 2E:
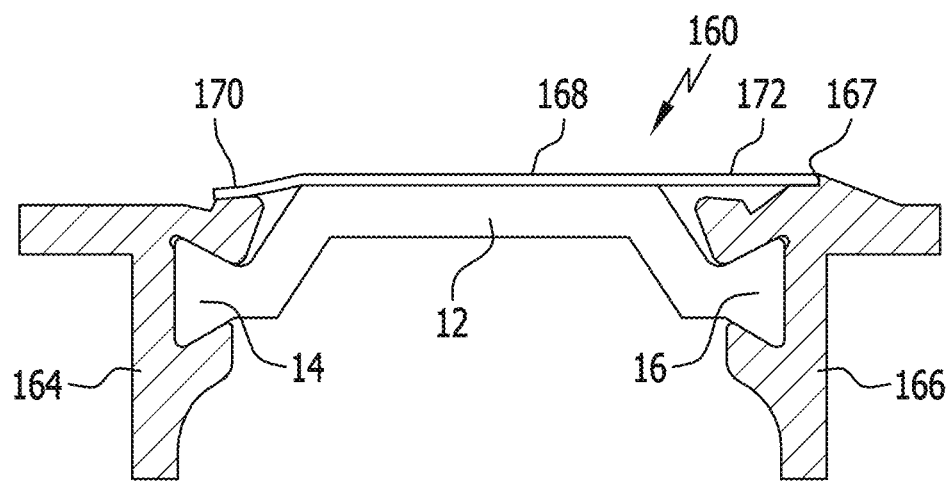

In a further embodiment, a metal-plastic composite profile 160 is used in FIG. 2E, in which the substrate base body 12 is first connected with the roll-in projections 14 and 16 to a metal profile 164 and a further metal profile 166 by means of rolling-in. Only after that is a two- or multi-layer coating 168 performed both on a surface region of the substrate base body 12 and reaching beyond that with rim regions 170, 172 on surface regions of the metal profiles 164 and 166, respectively. In this embodiment too, again a physical and optionally electrically conductive contact is produced between the coating 168 on the one hand and the metal profiles 164 and 166 on the other hand.

In this example, the metal profile 166 is provided with an adapted shape in order to create a particularly homogeneous, appealing appearance of the metal-plastic composite profile 160, in which the two- or multi-layer coating 168 flushly adjoins a projection 167 of the metal profile 166.

Furthermore, this embodiment shows that the coating 168, according to the invention, does not necessarily have to abut the surface of the substrate base body 12 over the entire area, but may also maintain a distance therefrom, e.g., in the region of continuous grooves, undercuts, channels, recesses, through-openings, or sharp bends and radii at projections or protrusions, as is shown in FIG. 2E, in which the coating does not abut the substrate base body over the entire area.

Figure 2F:
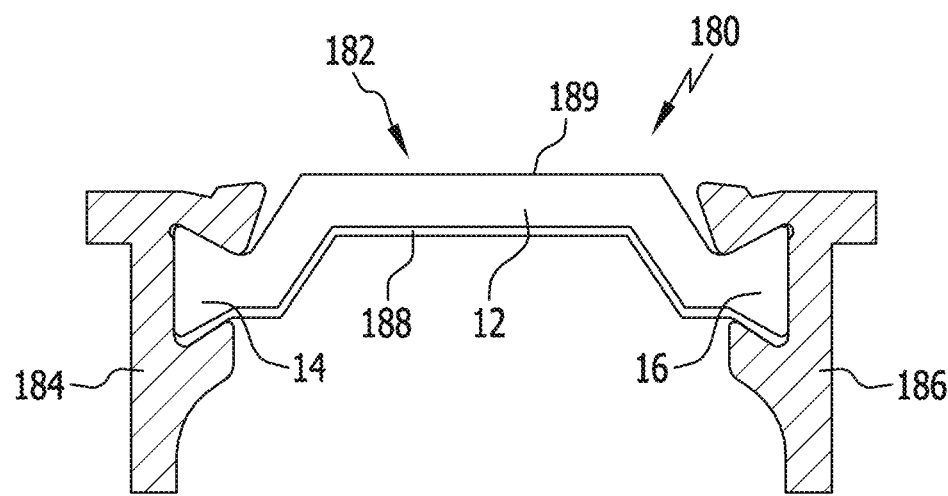

Finally, FIG. 2F shows a metal-plastic composite profile 180 in which a substrate in accordance with the invention in the form of an insulating web 182 is used, which on the one hand comprises a substrate base body 12 with roll-in projections 14 and 16 moulded thereon, which each are again connected to the metal profiles 184, 186 by way of a roll-in connection.

On the other hand, however, a two- or multi-layer coating 188 was applied to the substrate base body 12 of the insulating profile 182 before the assembly (rolling-in) thereof, but on a surface of the substrate base body 12 which extends in parallel to the surface 189 of the substrate base body that is to be provided later with a lacquer layer. Here too, provision is made for the two- or multi-layer coating 188 to be in physical contact with the metal profiles 184 and 186, such that an electrically grounded mechanism can optionally be used here in the electrostatic coating.

For the sake of simplicity, electrostatically applied lacquer layers are not shown in the depictions of FIG. 2. In these examples shown, said lacquer layers are applied to the surfaces of the metal-plastic composite profiles equipped with the two or multi-layer coating, which surfaces are arranged on top in the draw direction.

Figure 3A:
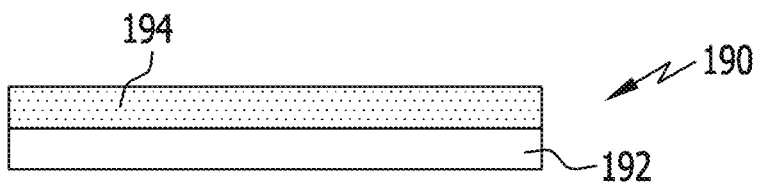
FIGS. 3A and 3B show schematic representations of embodiments of two-layer coatings for producing substrates in accordance with the invention.
Figure 3B:
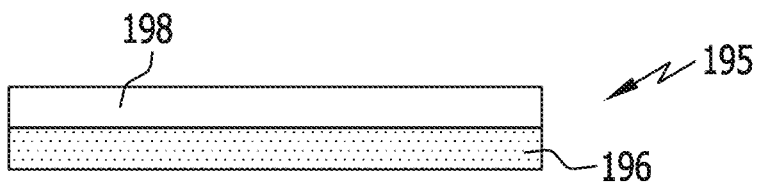

FIGS. 3A to 3B shows two alternatives for a two-layer coating, which can be used in the substrates in accordance with the invention, in particular those shown in FIGS. 1 and 2, wherein in FIG. 3A a coating 190 with a first layer 192 is shown, which is configured as a layer that imparts a bond (bonding layer), and a second layer 194, which is produced using a material that reduces the specific surface resistance of said layer 194 to a value of about $10^{10}$ Ohm or less.

For this type of coating, in particular a polymeric material, for example PET, in particular in the form of a film, filled with conductive soot is suitable for the layer 194.

In an alternative arrangement of the layers as is shown in the two-layer coating 195, in accordance with FIG. 3B a first layer 196 is provided in the form of a bonding layer, which simultaneously performs the function of a layer with reduced surface resistance. As a second layer 198, a cover layer, e.g., in the form of a polymer film, is used here which functions as a protective layer for the first layer (bonding layer) 196 with reduced surface resistance.

If the layer with reduced surface resistance is not simultaneously the layer forming the cover layer in a two- or multi-layer coating in accordance with the invention, the specific surface resistance can thus not be measured directly on the surface of the coating. In this case, it is recommended to, e.g., mechanically separate the layer structure of the coating (delaminate) in order to be able to measure the specific surface resistance directly on the then exposed dissipative layer or the layer with reduced surface resistance.

A plurality of variants of multi-layer coatings are shown in FIGS. 4A to 4G, which also may be used in substrates in accordance with the invention, in particular those shown in FIGS. 1 and 2.

Figure 4A:
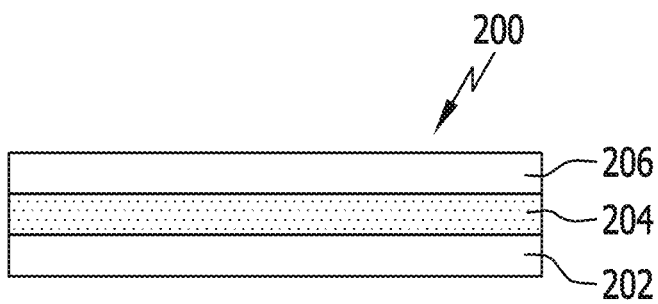
FIGS. 4A to 4G show a plurality of embodiments of multi-layer coatings for producing substrates in accordance with the invention.

According to the depiction of FIG. 4A, a multi-layer coating 200 is provided, which is of a three-layer construction and comprises, in addition to a first layer 202 that is configured as a bonding layer, a further layer 204 with reduced surface resistance placed thereon, which is finally overlaid with a second layer that is configured as a cover layer 206. In this embodiment of the multi-layer coating, the selection of materials for reducing the surface resistance in the further layer 204 may be made from a wide range of materials, in particular from metallic materials which, as the case may be, would be subject to corrosion upon further processing, because they are completely covered and protected by the cover layer 206. This layer structure can be easily represented, for example, from a thin metallized polymer film, which on the side of the metallization 204 is provided with an adhesive system 202 as a bonding layer (first layer), wherein the polymer film 206 then functions as the second layer or cover layer.

Figure 4B:
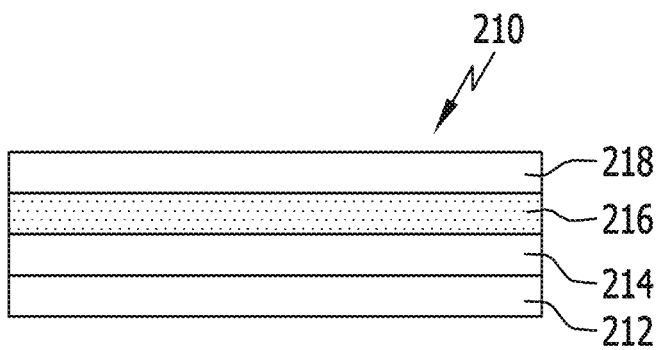

In FIG. 4B a four-layer embodiment is shown as a multi-layer coating 210 in which a layer 214 is applied as a support layer, made, e.g., of a polymer film, to a first layer 212 (bonding layer). A further layer 216 with reduced surface resistance is then arranged on said layer 214. The surface of the coating 210 then forms a cover layer 218 (second layer within the meaning of the invention), and this makes it possible to use materials that are sensitive to corrosion for reducing the surface resistance of the layer 216.

Figure 4C:
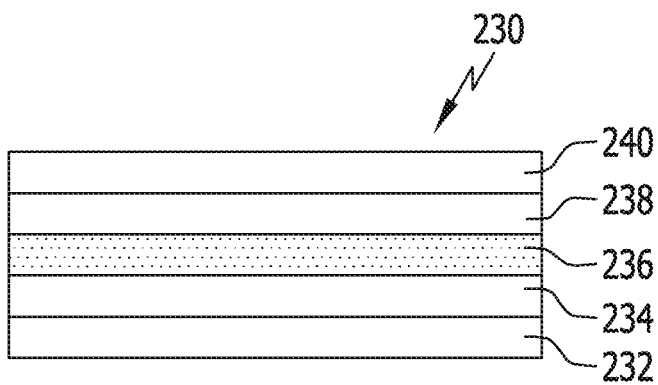

In FIG. 4C, essentially the layer structure of FIG. 4B is shown, though in the multi-layer coating 230, in addition to the first layer 232 (bonding layer), a layer 234 that is configured as a support layer, a further layer 236 with reduced surface resistance, and a layer as a connecting layer 238 are present, the latter made, e.g., of a laminating adhesive for better layer cohesion. This structure is again overlaid with a further layer 240, which has specific bonding properties for bonding a lacquer system to be applied. The layer structure of the embodiment of FIG. 4C can thereby be configured, e.g., as a self-adhesive film material, which can be applied to the substrate base body in a simple manner.

Figure 4D:
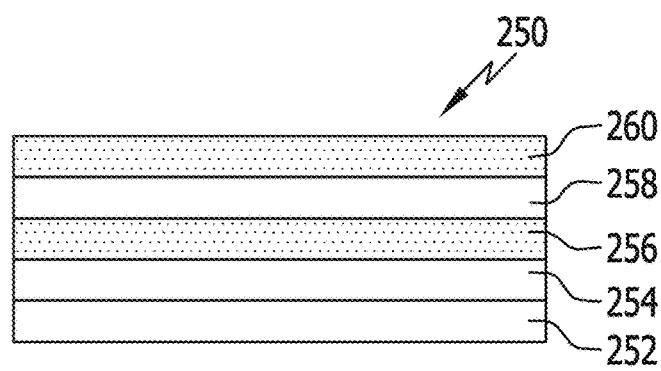

In the case of a multi-layer coating 250 of FIG. 4D, in the structure of the coating 250 first a first layer 252 is provided as a bonding layer, by way of which a further layer is arranged in the form of a support layer 254. A layer with reduced surface resistance is then arranged on the support layer 254, which layer with reduced surface resistance is then in turn covered by a protective or support layer 258. The surface of the coating 250 is then formed by a layer 260 that is also configured having a reduced surface resistance.

The two layers 250, 260 with reduced surface resistance may then each contain different materials in different proportions, wherein in each case the specific surface resistance of a layer is set to the value of $10^{10}$ Ohm or less.

If the layer 260 is deliberately made of a non-inert metal such as, e.g., aluminum, an oxidation of this layer may be performed, among other things in an anodizing process. The resulting layer of an aluminum oxide in position 260 then forms a lacquerable cover layer, which due to the chemical structure of the aluminum oxide has good bonding properties for a lacquering. Because the internal layer 256 with reduced surface resistance remains intact due to the protective layer 258, the prerequisite for a good lacquer coverage remains fulfilled and a structure that then corresponds approximately to the one shown in FIG. 4C is obtained.

Figure 4E:
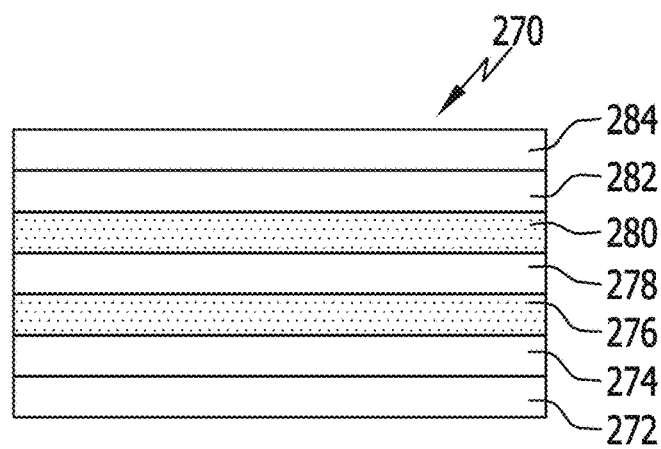

Finally, a multi-layer coating 270 is shown in FIG. 4E, which, building on a first layer 272 as a bonding layer, has a further layer 274 in the form of a support layer as well as a further layer 276 with reduced surface resistance placed thereon. A further layer 278 with the function of a layer holding the layer structure together is placed on this structure, said layer 278 being made, e.g., of a laminating adhesive, followed by a further layer 280 which has a reduced specific surface resistance.

The layer 280 with reduced surface resistance is overlaid with a further layer 282 that takes on the function of a further support layer, which is finally covered by a further layer 284 (the second layer within the meaning of the invention) that has the function of a cover layer and a layer that creates or ensures a bonding connection to a lacquer system that is later to be applied to the coating.

This structure can be designed so that the layers 274 and 282 are identical and optionally the layers 276 and 280 are also identical. This can be achieved in a simple manner such that, for example, two tracks of a plastic film that has been metallized on one side (metallization 276, 280 and plastic film 274, 282) are adhesively bonded against each other by means of a laminating adhesive 278. A first layer 272 and a further layer 284 can then be applied to this laminate.

Figure 4F:
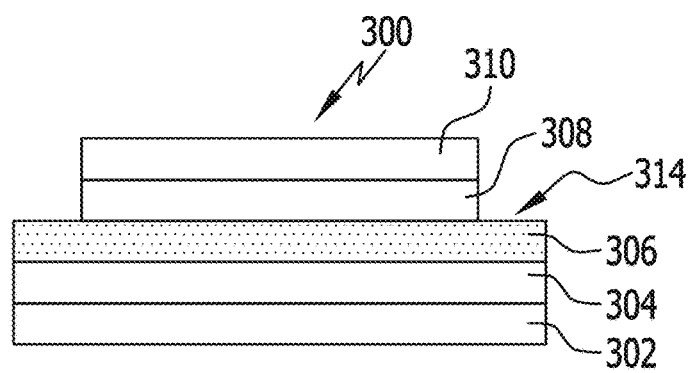

FIG. 4F shows schematically the structure of a coating 300 to be used in accordance with the invention, with a first layer 302 as a bonding layer, a further layer 304 that is configured as a support layer, and a further layer 306 placed thereon, which has a reduced surface resistance.

Two further layers 308 and 310 are then applied on this layer 306, which—as was already described in FIG. 4C—function as a connecting layer and as a cover layer (or second layer within the meaning of the invention), wherein the latter has specific bonding properties for bonding a lacquer system to be applied.

In contrast to the coating structure of FIG. 4C, the two uppermost layers 308 and 310 are configured having a smaller width, so that there is an overhang 314, consisting of the layers 302, 304, and 306, on both sides of the coating 300, which overhang 314 makes it possible for the thus partially exposed layer 306 with reduced surface resistance to be able to be directly physically contacted by a metal profile and thus be electrically conductively brought into connection.

Figure 4G:
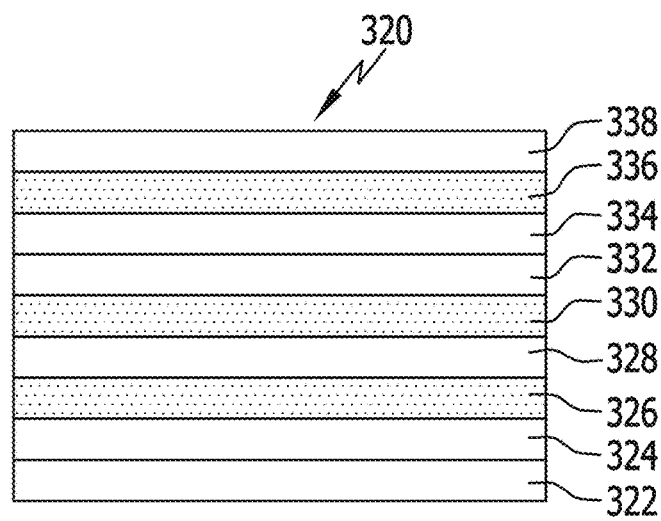

FIG. 4G shows a further exemplary structure of a coating 320 to be applied to the substrate base body in accordance with the invention, said coating 320 having a first layer 322 which is configured as a bonding layer. In this embodiment, as in all other embodiments of the invention, the first layer 322 may be applied to the substrate base body together with the further layers or separately, wherein the further layer(s) is/are then preferably placed together on the bonding layer 322.

In the structure of the coating 320, the first layer 322 is followed by a further layer 324 in the form of a PET film and a metallic layer 326 with reduced surface resistance made of aluminum. The following layer 328 is made of a laminating adhesive, which ensures a permanent bond of the layer 326 to the following layer 330. The layer 330 is a further layer with reduced surface resistance and is made of aluminum, the layer 332 again consisting of a PET film. A layer 336 with reduced surface resistance is connected to the already described layers by way of a layer 334 made of a laminating adhesive. Finally, a layer 338 made of a PET film forms as the first layer a lacquerable cover layer of the coating 320.

The use of more than one layer with reduced surface resistance has the advantage that the electrical capacity of the coating is increased, in a way that such coatings are recommended in particular when powder coating is to be applied according to a capacitive method. Likewise, the permeability, e.g., for water vapor can be reduced in a simple manner by means of such complex layer structures by there being a plurality of layers with a barrier effect, e.g., with an aluminum coating.

Figure 5A:
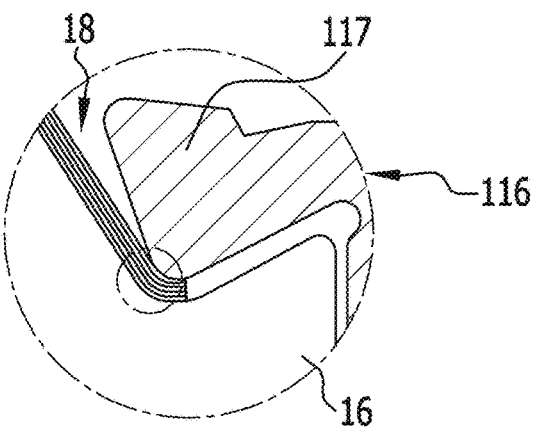
FIGS. 5A to 5D show detailed representations of a section of FIG. 2A in multiple variants.

FIGS. 5A to 5D shows in detailed FIG. 5A a section of FIG. 2A, namely the part of the composite profile 110 in which the roll-in body 16 engages into the groove of the metal part 116, wherein a physical contact of the coating 18 with the so-called roll-in hammer 117 of the metal profile 116 is created there by rolling in.

Figure 5B:
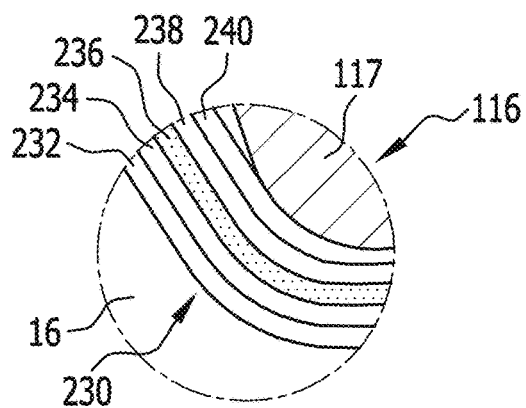
Figure 5C:
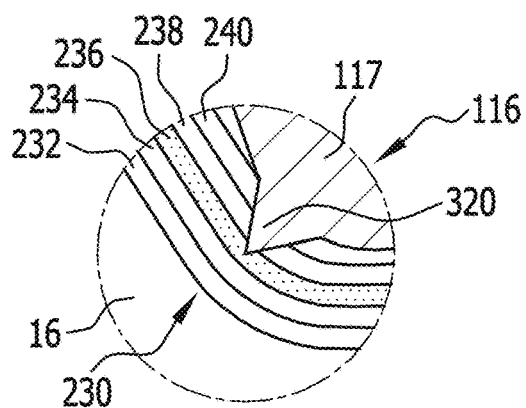
Figure 5D:
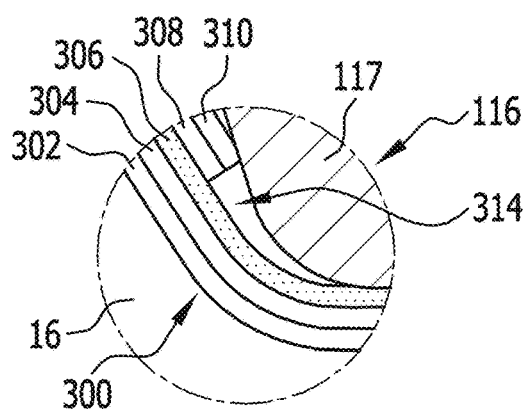

This contact between the coating 18 and the roll-in hammer 117 or the metal profile 116 can be created in different ways, as is shown schematically in FIGS. 5B to 5D. A multi-layer coating is shown as the coating 18, which in the case of FIGS. 5B and 5C corresponds in layer structure to the structure that is schematically shown in FIG. 4C, while in the illustration 5D a coating 300 of FIG. 4F is used.

In FIG. 5B, a mechanical contact is produced between the roll-in hammer 117 of the metal profile 116 and the coating 18 and 230, respectively, wherein no electrically conductive connection between the metal profile 116 and the layer 236 with reduced surface resistance is produced here.

The situation is different in FIG. 5C, in which the surface of the roll-in hammer 117 of the metal profile 116 is knurled on the side contacting the coating and has a sort of tooth profile 320, which can penetrate through the two superficial layers 238, 240 and come into contact with the layer 236, such that an electrically conductive or dissipative contact between the metal profile 116 and the layer 236 with reduced surface resistance is also produced here.

In a further alternative that is shown in FIG. 5D, the coating 300, which is shown in FIG. 4F, is used as the coating 18, in which the overhang 314 at the rim of the coating 300 comes into physical contact with the roll-in hammer 117 during the roll-in operation, wherein, because the layer 306 with reduced surface resistance is exposed in the region 314, an electrically conductive contact between the metal profile 116 and the coating or the layer 306 is established.

Figure 6A:
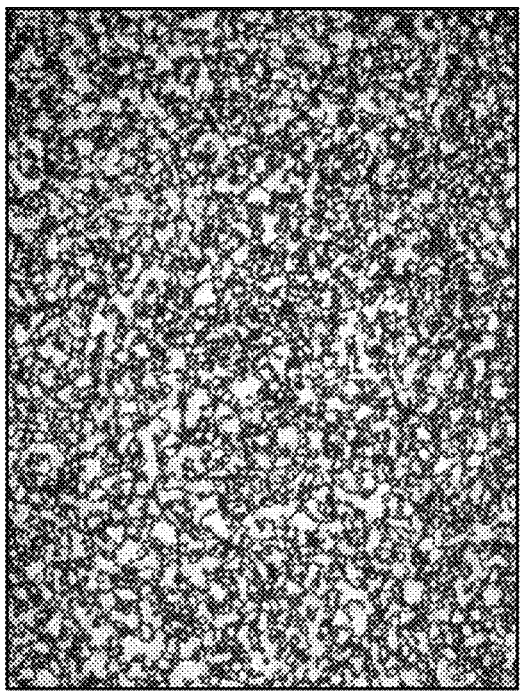
FIGS. 6A to 6D show powder lacquered substrates in accordance with the invention with different lacquer coverages.

FIGS. 6A to 6D shows for example the determination of the lacquer coverage of conventional substrates and substrates powder coated in accordance with the invention, wherein in FIG. 6A an optically microscopic image at 50× magnification can be seen, in which a white powder lacquer was applied to a conventional black substrate base body (without a coating in accordance with the invention). It is already apparent from the color structure or the pattern that the lacquer coverage is incomplete and the lacquer layer is divided into may individual or island-like regions.

Figure 6B:
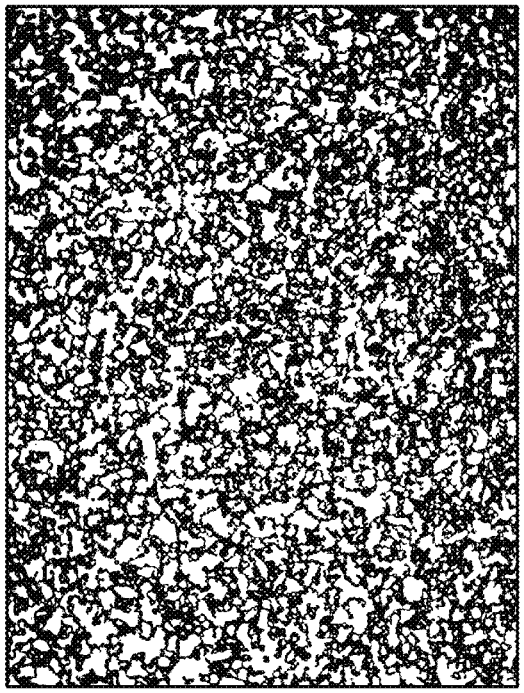

As can be seen in FIG. 6B, this image of FIG. 6A is converted into a black and white image, and the same is then evaluated with respect to the white surface portions, which in this case results in a lacquer coverage of 47.2%.

Figure 6C:
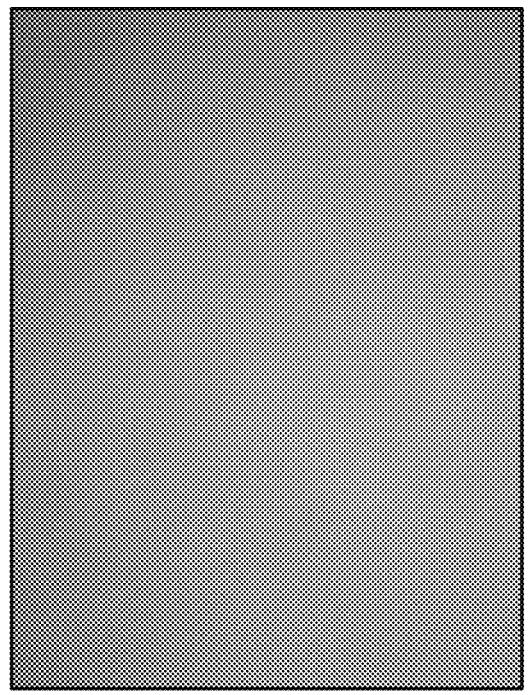
Figure 6D:
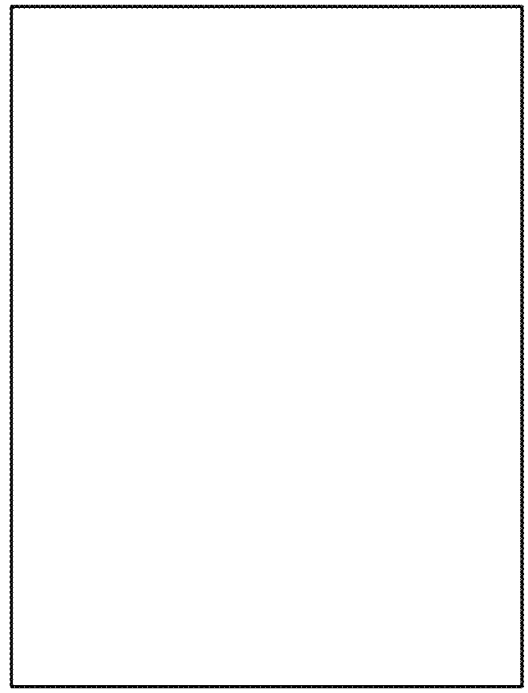

FIG. 6C shows a substrate in accordance with the invention in the same resolution as in FIGS. 6A and 6B with a white lacquer coating applied on a coating in accordance with the invention, wherein in FIG. 6D the same surface is shown after a conversion into a black and white image. One can already clearly see here a homogeneous lacquer coverage. Here, a lacquer coverage of 100% was achieved under the same lacquering conditions as in the sample of FIG. 6A/B.

EXAMPLES

For producing coatings in accordance with the invention, the following materials were used:

Material A: Coating with a layer structure, as is shown in FIG. 4G. A film laminate is present, consisting of an about 40 μm to 43 μm thick stack of three plastic films (polyester films (PET), layers 324, 332, 338) each with a thickness of about 10 μm to about 13 μm), wherein each PET film is metallized with aluminum (thickness of the metallization per PET film in each case <80 nm, layers 326, 330, 336). The three metallized films are connected to each other by means of an acrylate adhesive (layers 328, 334) and then form the film laminate. The film laminate thus has three layers with reduced surface resistance. The second layer within the meaning of claim 1 is hereby an exposed PET layer (layer 338). Internal metallization layers are present due to the described laminate construction. A separate bonding layer of an acrylate-based bonding adhesive is selected as the first layer (layer 322), the layer thickness of which is about 20 μm to about 30 μm.

Material B: Coating with a layer structure as shown in FIG. 4A on the basis of a PET film with a thickness of about 10 μm to about 15 μm. The film (second layer 206) is metallized on one side with aluminum (layer 204), the thickness of the metallization is <40 nm. The metallized film (layers 204, 206) is adhered to a substrate base body by means of a separately applied cross-linking adhesive (bonding layer or first layer 202), such that the metallization directly adjoins the adhesive of the bonding layer. The metallization is thus an internal layer. The bonding layer is formed from the cross-linking adhesive (hybrid adhesive, consisting of a 1K moisture-cross-linking silane-terminated polymer) with an applied layer thickness of about 20 μm to about 40 μm.

Substrate base bodies: Commercially available insulating profiles (in the color black) of the type Insulbar® REG and Insulbar® LO18 of the company Ensinger GmbH were used as substrate base bodies. These insulating profiles consist of the materials TECATHERM® 66GF (polyamide 66 with 25% glass fiber content) and TECATHERM® LO (polyamide 66+polyphenylene ether blend with 20% glass fiber content (GF)). The moisture content of the plastic profiles and the substrate base bodies was quantified according to the Karl Fischer method (DIN EN ISO 15512).

In the following examples, the substrates and substrate base bodies are connected, as the case may be, to commercially available aluminum profiles by rolling in to form composite profiles.

The lacquering tests were performed with a white powder lacquer of the type SA816G Interpon D1036 (manufacturer: Akzo Nobel Powder Coatings GmbH). The powder lacquer was applied using a commercially available powder gun for electrostatic powder coating and was baked in an oven at 200° C. for 20 minutes.

Figure 7:
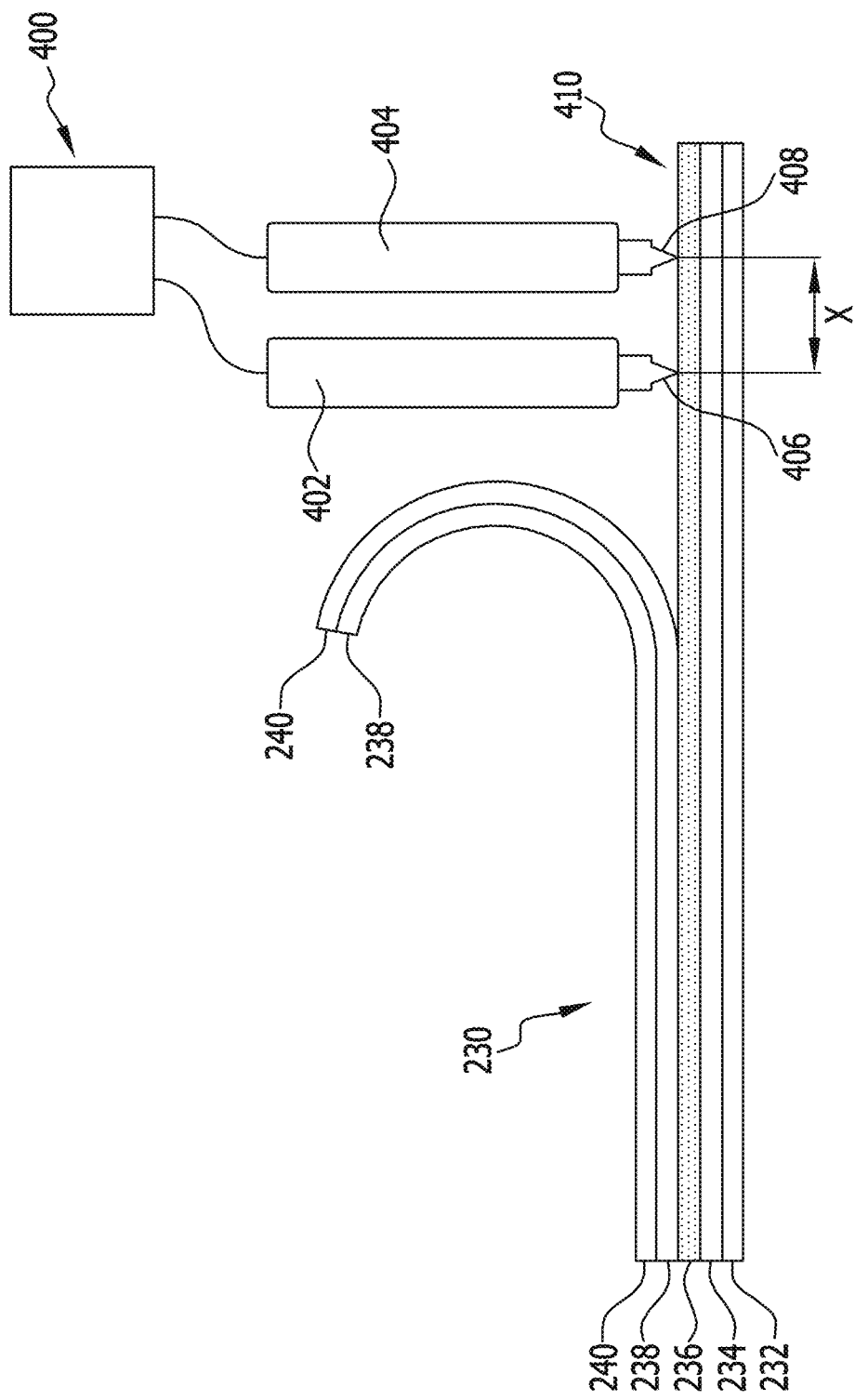
FIG. 7 shows a schematic depiction of a measurement setup for determining the surface resistance in an accelerated method.

For measurements by means of the accelerated method, a commercially available electrotechnical handheld measuring device, a so-called multimeter, here a multimeter of the type Fluke 177 (Fluke Deutschland GmbH), which then is operated in the mode "resistance measurement". The experimental setup is shown schematically in FIG. 7 in connection with the measurement on a sample of a coating 230 of FIG. 4C, which is structured in accordance with the invention. The electrodes used typically have punctiform measuring tips.

Two electrodes 402, 404 with bare, punctiform measuring tips 406, 408 are connected to a measuring device 400 and are placed on the exposed surface 410 of the layer structure of the coating 230 that is to be tested at a distance X from each other, which is greater than the diameter of the measuring tips 406, 408 (X is 1 cm, for example). For this purpose, the layers 238 and 240 ware partially detached. The sample 230 must thereby lie on an electrically non-conductive base (e.g., a plate made of Plexiglas; not shown).

Example 1: Measurement of the Surface Resistances of Materials

Measurements of the respective surface resistance were performed on test samples in accordance with the invention and on test samples not in accordance with the invention. For this purpose, the measurement was performed using a measuring device according to DIN EN 61340-2-4 for determining the specific surface resistance, the measuring device having a lower measuring limit of about $1 \times 10^5$ Ohm, as well as the accelerated method described above, with a measuring upper limit of about $5 \times 10^7$ Ohm.

Example 1a (Reference): Measurement on a Commercial Insulating Profile Insulbar REG (without a Coating)

It is determined that no electrical conductivity or too high a surface resistance is present. The values are displayed in Table 1.

Examples 1b and 1c: Measurements on a Separate Multi-Layer Film Laminate (Material A) with an External PET Layer and Metallization Thereunder This laminate may be used to produce a coating in accordance with the invention on a substrate base body. For an approximation calculation of the $\lambda$, thicknesses product, in sum a layer thickness of 42 μm of polymer (PET film and acrylate laminating adhesive) with a value for the heat conductivity of 0.24 W/mK and three layers of aluminum, each 80 nm (i.e., a summed thickness of 240 nm of aluminum) with a value for the heat conductivity of 236 W/mK (pure aluminum) is assumed.

The result of $6.7 \times 10^{-5}$ W/K is below $1 \times 10^{-4}$ W/K and thus indicates minimal and therefore desired heat transfer. Even after including a bonding adhesive in order to adhesively bond the laminate to the surface of the base profile (assume: 30 μm adhesive with 0.18 W/mK; yields an additional k-thickness product of $5.4 \times 10^{-6}$ W/K), with a total of $7.2 \times 10^{-5}$ W/K the limit value of $1 \times 10^{-4}$ W/K is not exceeded.

In Example 1b, the outer surface of the laminate, which constitutes a second layer in accordance with the invention, was tested for electrical conductivity. It is determined that no electrical conductivity or a too high (specific) surface resistance is present.

In Example 1c one of the internal metallized layers was preparatively exposed. For this purpose, the laminate was mechanically delaminated, so that the surface resistance of an internal metallized layer could be tested. This exposed aluminum-vapor deposited layer with reduced surface resistance then exhibited an electrical conductivity according to the two measuring methods.

Example 1d (Reference): Testing a Rolled Aluminum Film

This pure metal layer made of rolled aluminum then displayed an electrical conductivity according to both measuring methods. The product of the thickness of the layer of rolled aluminum (thickness: 11 μm) and the value of the heat conductivity of 236 W/mK for pure aluminum results in an approximate value of $2.6 \times 10^{-3}$ W/K and thus indicates a high and therefore undesired heat transfer. Rolled aluminum films with thicknesses that large in the μm-range are typically used as IR-reflectors in complex composite profiles, though for such purpose they are placed perpendicular to the main direction of heat transmission, as a result of which they are not able to adversely contribute to the heat conduction. Due to the high heat conductivity, films of that kind are not suitable to be use in heat insulating profiles substantially in parallel to the main direction of heat transmission.

Examples 1e and 1f: Measurements on a PET Film Metallized on One Side with Aluminum This coated film may be used to produce a coating in accordance with the invention. For an approximation calculation of the $\lambda$, thicknesses product, a layer thickness of at most 15 μm of polymer (PET film) with an estimated value of heat conductivity of 0.24 W/mK and a metallization layer of aluminum with a layer thickness of at most 40 nm and a heat conductivity of 236 W/mK (pure aluminum) is assumed.

The result of the result of the $\lambda$, thicknesses product of $1.3 \times 10^{-5}$ W/K or after inclusion of a thick bonding layer (plus $1.2 \times 10^{-5}$ W/K according to estimation: 40 μm adhesive with 0.3 W/mK) of $2.5 \times 10^{-5}$ W/K is under $1 \times 10^{-4}$ W/K and thus indicates a desirably low heat transfer. Now when measuring on the side of the metal vapor deposition (Example 1e), the test for electrical conductivity results in a good conductivity with a specific surface resistance of $<1 \times 10^5$ Ohm and a value of about $3.0 \times 10^3$ Ohm according to the accelerated test, respectively. The measurement of the PET side of the film (Example 1f) results in high electrical surface resistances, which are outside the measuring range of the accelerated test and according to the standard method DIN EN 61340-2-4 result in a specific surface resistance with a value of $1.21 \times 10^{15}$ Ohm.

TABLE 1

Properties of surfaces and determination of the electrical surface resistance

| Example | Type | Thickness of the surface layer | Description of the measured surface layer | Resistance according to multimeter accelerated test (A = 1 cm) [Ω] | Specific surface resistance [Ω] according to DIN EN 61340-2-4 |
|---|---|---|---|---|---|
| 1a | Insulating profile insulbar ® REG (PA66GF25) | Homogeneous composite material 1.8 mm | PA66 25% GF | outside the measuring rage >5 × 10$^7$ | 4.5 × 10$^{13}$ |
| 1b | Multi-layer laminate with external layer and metallization thereunder | 11-15 μm PET | PET film | outside the measuring rage >5 × 10$^7$ | 2.7 × 10$^{12}$ |
| 1c | Multi-layer laminate according to Example 1b: external PET layer was preparatively removed and the metallization thereunder was exposed | 40-80 nm | Aluminum (metal vapor deposition) | 7.8 × 10$^0$ | <1 × 10$^5$ |
| 1d | Aluminum film (rolled aluminum) | 11-14 μm | Aluminum | 2.2 × 10$^0$ | <1 × 10$^5$ |
| 1e | Film material: PET-single layer with metallization on one side, measurement on the side with metallization | <40 nm | Aluminum (metal vapor deposition) | 3.0 × 10$^3$ | <1 ×10$^5$ |
| 1f | Film material: PET-single layer with metallization on one side, measurement on the PET film side | 10-15 μm | PET film | outside the measuring rage >5 × 10$^7$ | 1.21 × 10$^{15}$ |

Example 2: Lacquering Results of the Powder Coating of Composite Profiles

Example 2a (Reference): Plastic-Aluminum Composite Profile, Constructed from Insulating Profiles of the Type Insulbar® REG and Suitable Aluminum Half-Shells The profile composites were dried before powder lacquering to a residual moisture in the profile of <0.3% by weight. It is determined that after lacquering and baking, the lacquer application on the plastic profile is incomplete and the lacquer coverage varies greatly. The lacquer coverage rate is thereby in the range of only about 40% to 55%.

Example 2b: Plastic-Aluminum Composite Profile, Constructed from Insulating Profiles of the Type Insulbar® REG with a Coating of the Material a An insulating profile was equipped with a material A as a coating in accordance with the invention. A composite profile was produced together with aluminum half-shells suitable therefor. The coating with the material A was configured such as to obtain a roll-in situation in accordance with FIG. 2A.

Composite profiles produced in such a manner were dried before powder lacquering to a residual moisture in the plastic profile of <0.3% by weight. It is determined that a uniform powder coverage is achieved in the powder application. After baking, a uniform homogeneous lacquer layer (lacquer coverage rate of 100%) on the plastic profile is obtained, which corresponds in surface structure and coverage largely to the lacquer layer formed on the aluminum shells of the composite profile. The coating is thus considered optimal.

Example 2c (Reference): Plastic-Aluminum Composite Profile, Constructed from Insulating Profiles of the Type Insulbar® REG and Suitable Aluminum Half-Shells The profile composites were not dried before powder lacquering and were processed with a residual moisture in the plastic profile of >1% by weight. It is determined that a full-area powder coverage is achieved in the powder application. After the lacquer-baking step, however, the differences in thickness of the lacquer layer are apparent in a negative way, which manifest themselves in brightness differences due to the black substrate shining through. Also negative in part is a very pronounced formation of bubbles in the region of the lacquer layer applied to the plastic profile. These bubbles are due to outgassing of residual moisture and constitute an undesirable defective appearance that is clearly visible to the naked eye.

Example 2d: Plastic-Aluminum Composite Profile, Constructed from Insulating Profiles of the Type Insulbar® REG, are Equipped with Material a and Aluminum Half-Shells Suitable Therefor The coating was configured such that a roll-in situation according to FIG. 2A was produced. The composite profiles were not dried before powder lacquering and were processed with a residual moisture in the plastic profile of >1% by weight. It is determined that a uniform powder coverage with a rate of 100% is achieved in the powder application. After baking, a uniform homogeneous lacquer layer on the plastic profile is obtained, which corresponds in surface structure and coverage largely to the lacquer layer on the aluminum shells of the composite profile. The coating is thus optimal.

Example 2e (Reference): Plastic-Aluminum Composite Profile, Constructed from Insulating Profiles of the Type Insulbar® LO18 and Suitable Aluminum Half-Shells The composite profile was dried before powder lacquering to a residual moisture in the plastic profile of <0.3% by weight. It is determined that after lacquering and baking, the lacquer application on the plastic profile is incomplete and the rate of average lacquer coverage is in the range of only about 50%.

Example 2f: Plastic-Aluminum Composite Profile, Constructed from Insulating Profiles of the Type Insulbar® LO18, which are Equipped According to the Invention with Material B, as Well as Aluminum Half-Shells Suitable Therefor The composite profile that is obtained corresponds to the roll-in situation according to FIG. 2C. The layer structure of material B corresponds to the layer structure according to FIG. 4A. The composite profiles were dried before powder lacquering to a residual moisture in the plastic profile of <0.3% by weight. It is determined that a uniform powder coverage is achieved in the powder application. After baking, a uniform homogeneous lacquer layer (lacquer coverage rate of 100%) on the plastic profile is obtained, which corresponds in surface structure and coverage largely to the lacquer layer on the aluminum shells of the composite profile. The coating is thus optimal.

The invention claimed is:

1. A polymer-based substrate, comprising a substrate base body made using a polymeric material and a two layer coating applied to a surface region of the substrate base body, the polymeric material comprising reinforcing substances selected from the group consisting of particulate reinforcing substances and fibrous reinforcing substances, wherein a first layer of the two-layer coating is a bonding layer and is arranged in contact with the surface region of the substrate base body, wherein a second layer of the two-layer coating is an electrostatically lacquerable cover layer, wherein the second layer of the two-layer coating is a layer with reduced surface resistance using a proportion of an electrically non-insulating material, such that the electrically non-insulating material results in a specific surface resistance of the second layer of the coating of about $10^{10}$ Ohm or less, wherein at least one layer of the two-layer coating is a film, and the polymer-based substrate further comprises a powder lacquer layer applied to the second layer of the two-layer coating wherein the powder lacquer layer is an outermost layer of the polymer-based substrate.

2. The substrate in accordance with claim 1, wherein the bonding layer is configured as an adhesive layer, a primer layer with an adhesive layer, or as a layer that is weldable to the substrate base body.

3. The substrate in accordance with claim 1, wherein the specific surface resistance of the layer with reduced surface resistance is about $10^9$ Ohm or less.

4. The substrate in accordance with claim 1, wherein the electrically non-insulating material that is used for producing the layer with reduced surface resistance is a metallic material and wherein the layer with reduced surface resistance has a thickness of about 500 nm or less.

5. The substrate in accordance with claim 1, wherein the layer with reduced specific surface resistance comprises a non-metallic electrically conductive or semi-conductive material, which is selected from
   a) conductive carbon materials, selected from conductive soot, graphite, graphene, carbon nanotubes (CNT), or a carbon nanotubes (CNT) or a carbon layer;
   b) conductive inorganic materials, selected from conductive tin oxides;
   c) intrinsically conductive polymers; and/or
   d) conductively equipped polymeric materials, comprising a non-conductive polymer and an additive reducing the electrical resistance of the non-conductive polymer, which additive is selected from conductive soot, graphite, graphene, CNT, and conductive inorganic materials and intrinsically conductive polymers.

6. The substrate in accordance with claim 1, wherein the electrically non-insulating material used in the layer with reduced surface resistance is an electrically conductive material comprising a fiber material with electrically conductive or semi-conductive fibers wherein the fiber material comprises metal fibers, fibers of conductive polymer, conductively equipped polymer fibers, CNT, and/or carbon fibers.

7. The substrate in accordance with claim 1, wherein the two-layer coating has a layer which comprises a plastic material selected from the group consisting of polyolefin, EVA, polyester, polyamide, vinyl polymer, and copolymers thereof.

8. The substrate in accordance with claim 1, wherein one of the layers of the two-layer coating is a monoaxially or biaxially stretched film.

9. The substrate in accordance with claim 1, wherein the two-layer coating on the surface region of the substrate base body has a thickness of about 200 μm or less.

10. The substrate in accordance with claim 1, wherein a sum of products of a respective thickness of a layer and a value of a thermal conductivity of the respective layer for all layers of the two-layer coating results in a total value of about $1 \times 10^{-4}$ W/K or less.

11. The substrate in accordance with claim 1, wherein the two-layer coating is detachably connected to the substrate base body.

12. The substrate in accordance with claim 1, wherein the two-layer coating is non-detachably connected to the substrate base body.

13. The substrate in accordance with claim 1, wherein the two-layer coating is configured as a diffusion barrier against outgassing from the substrate base body.

14. The substrate in accordance with claim 1, wherein the substrate is configured as a heat-insulating profile.

15. The substrate in accordance with claim 1, wherein the powder lacquer layer has a layer thickness in the range of about 10 μm to about 300 μm.

16. The substrate in accordance with claim 15, wherein the powder lacquer layer is applied to the electrostatically lacquerable cover layer of the layer coating with a lacquer coverage of about 90% or more.

17. A polymer-based substrate, comprising a substrate base body made using a polymeric material and a multi-layer coating applied to a surface region of the substrate base body, the polymeric material comprising reinforcing substances selected from the group consisting of particulate reinforcing substances and fibrous reinforcing substances, wherein a first layer of the multi-layer coating is a bonding layer and is arranged in contact with the surface region of the substrate base body, wherein a second layer of the multi-layer coating is a layer with reduced surface resistance having a proportion of an electrically non-insulating material, such that the electrically non-insulating material results in a specific surface resistance of about $10^{10}$ Ohm or less, wherein a further layer of the multi-layer coating provides a cover layer and is a film, and the polymer-based substrate further comprising a powder lacquer layer applied to the cover layer wherein the powder lacquer layer is an outermost layer of the polymer-based substrate.

18. The substrate of claim 17, wherein the substrate base body is a hollow chamber profile.

19. The substrate of claim 17, wherein the substrate base body is a non-hollow chamber profile.

\* \* \* \* \*